(12) United States Patent
Jeon et al.

(10) Patent No.: US 12,141,394 B2
(45) Date of Patent: Nov. 12, 2024

(54) INPUT SENSING PART AND DISPLAY DEVICE INCLUDING THE SAME FOR DECREASING INTERFERENCE

(71) Applicant: Samsung Display Co., Ltd., Yongin-si (KR)

(72) Inventors: Hyunjee Jeon, Yongin-si (KR); Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/184,588

(22) Filed: Mar. 15, 2023

(65) Prior Publication Data

US 2023/0384889 A1    Nov. 30, 2023

(30) Foreign Application Priority Data

May 24, 2022 (KR) .................. 10-2022-0063451

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/0446* (2019.05); *G06F 2203/04107* (2013.01); *G06F 2203/04111* (2013.01)

(58) Field of Classification Search
CPC .................................................. G06F 3/04166
See application file for complete search history.

(56) References Cited

U.S. PATENT DOCUMENTS

| 5,488,627 | A | 1/1996 | Hardin et al. | |
|---|---|---|---|---|
| 9,766,730 | B2 | 9/2017 | Lee | |
| 11,126,302 | B2 | 9/2021 | Shin | |
| 2018/0329570 | A1* | 11/2018 | Chan | G06F 3/04184 |
| 2019/0204944 | A1* | 7/2019 | Jun | G06F 3/0412 |
| 2019/0354738 | A1* | 11/2019 | Baek | G06F 1/163 |
| 2020/0210021 | A1* | 7/2020 | Ju | G06F 3/0442 |
| 2023/0214060 | A1* | 7/2023 | Kim | G06F 3/044 |
| | | | | 345/173 |

FOREIGN PATENT DOCUMENTS

| KR | 10-2018-0003369 | A | 1/2018 |
|---|---|---|---|
| KR | 10-2018-0076512 | A | 7/2018 |
| KR | 10-2338362 | B1 | 12/2021 |

* cited by examiner

*Primary Examiner* — Gustavo Polo
(74) *Attorney, Agent, or Firm* — Lewis Roca Rothgerber Christie LLP

(57) ABSTRACT

Disclosed is an input-sensing part which includes first sensing electrodes each receiving a driving signal every frame, and second sensing electrodes insulated from the first sensing electrodes and extending to intersect the first sensing electrodes. A cycle of the driving signal is defined by a period of a first signal and a period of a second signal, which is a signal following the first signal and is lower in level than the first signal. A frequency of the driving signal is variable. When the frequency of the driving signal changes, the first period is fixed, and the second period changes.

20 Claims, 18 Drawing Sheets

FIG. 1
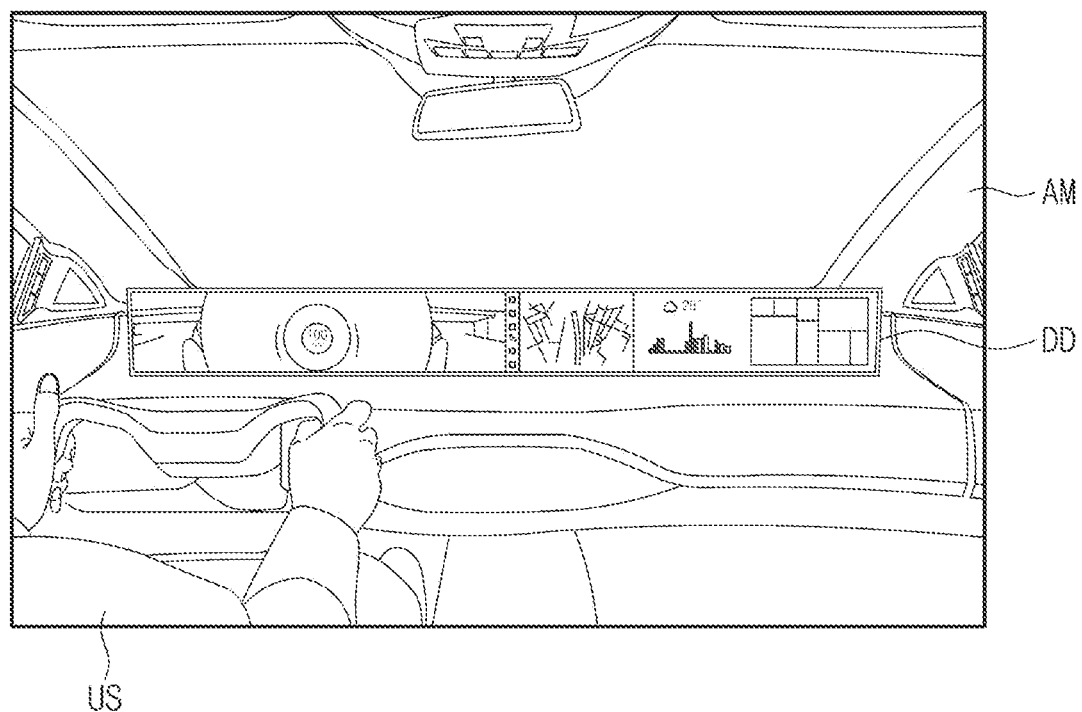
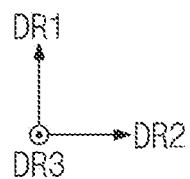

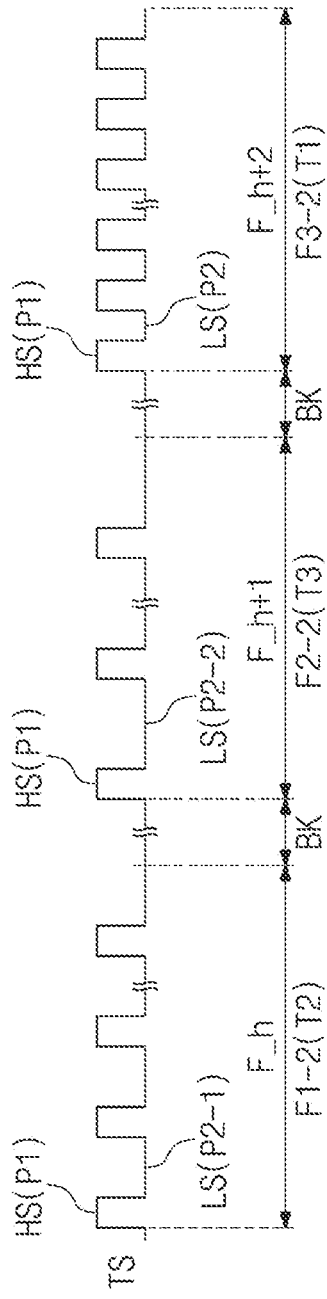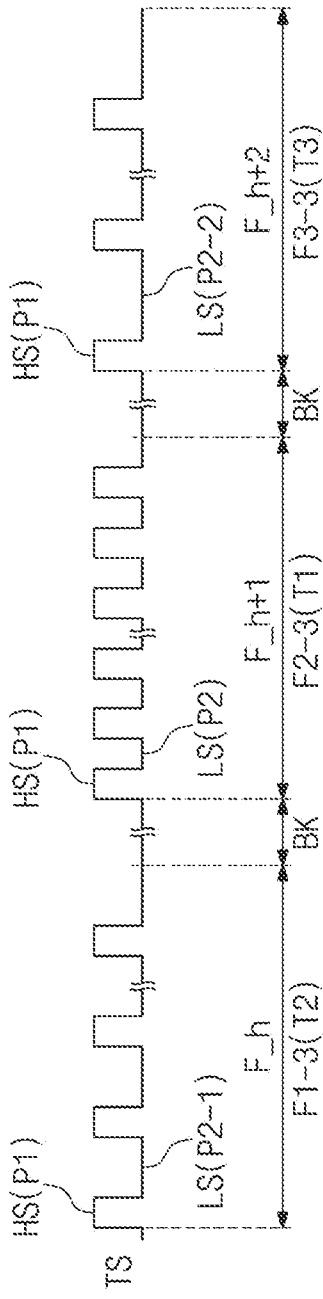

INPUT SENSING PART AND DISPLAY DEVICE INCLUDING THE SAME FOR DECREASING INTERFERENCE

CROSS-REFERENCE TO RELATED APPLICATION

This application claims priority to, and the benefit of, Korean Patent Application No. 10-2022-0063451 filed on May 24, 2022, in the Korean Intellectual Property Office, the disclosures of which are incorporated by reference herein in their entireties.

BACKGROUND

Embodiments of the present disclosure described herein relate to an input-sensing part and a display device including the same.

In general, an electronic device, which provides images to a user, such as a smartphone, a digital camera, a notebook computer, a navigation system, or a smart television includes a display device for displaying images. The display device generates an image and then provides the user with the generated image through a display screen.

The display device includes a display panel that generates an image and an input-sensing part that is located on the display panel to sense an external input. The input-sensing part is located on the display panel and senses a touch of the user as an external input. The input-sensing part includes a plurality of sensing electrodes for sensing an external input, and a plurality of sensing lines connected with the sensing electrodes. The sensing electrodes are located in an active area, and the sensing lines are located in an inactive area around the active area.

Driving signals are applied to the sensing electrodes, and a capacitance change of the sensing electrodes is output as a sensing signal. The driving signals are applied to the sensing electrodes through the sensing lines. When a driving signal with a given frequency is applied to a sensing electrode, an electromagnetic wave according to the driving signal may be radiated as an unnecessary electromagnetic signal.

The electromagnetic signal may act as a noise to other devices. That is, the electromagnetic signal may interfere with operations of the other devices. This phenomenon may be defined as an electromagnetic interference (EMI). Accordingly, a technology for reducing the electromagnetic interference may be suitable.

SUMMARY

Embodiments of the present disclosure provide an input-sensing part capable of decreasing an electromagnetic interference and a display device including the same.

According to one or more embodiments, an input-sensing part may include first sensing electrodes configured to receive a driving signal having a variable frequency, and second sensing electrodes insulated from the first sensing electrodes, extending to cross the first sensing electrodes, and configured to output a sensing signal, wherein a cycle of the driving signal is defined by a first period of a first signal, and a second period of a second signal following the first signal and lower in level than the first signal, and wherein, when the frequency of the driving signal changes, the first period is constant, and the second period changes.

The second period may be greater than or equal to the first period.

The first period may be set to a sum of a first charging period, in which the sensing signal is charged to a maximum level along the first signal and maintains the maximum level during a given time, and a first reset period following the first charging period.

The second period may be set to a value that is greater than or equal to a sum of a second charging period, in which the sensing signal is charged to a minimum level along the second signal and maintains the minimum level during a given time, and a second reset period following the second charging period.

The frequency may change every frame.

The frequency of the driving signal of a h-th frame may be different from the frequency of the driving signal of a (h+1)-th frame, where h is a natural number.

The second period of the (h+1)-th frame may be greater than the second period of the h-th frame.

The second period of the (h+1)-th frame may be less than the second period of the h-th frame.

The frequency of the driving signal of the h-th frame, the frequency of the driving signal of the (h+1)-th frame, and the frequency of the driving signal of a (h+2)-th frame may be different from each other.

The second period of the (h+1)-th frame may be greater than the second period of the h-th frame, and the second period of the (h+2)-th frame may be greater than the second period of the (h+1)-th frame.

The second period of the (h+1)-th frame may be less than the second period of the h-th frame, and the second period of the (h+2)-th frame may be less than the second period of the (h+1)-th frame.

The second period of the (h+1)-th frame may be greater than the second period of the h-th frame, and the second period of the (h+2)-th frame may be less than the second period of the h-th frame.

The second period of the (h+1)-th frame may be less than the second period of the h-th frame, and the second period of the (h+2)-th frame may be greater than the second period of the h-th frame.

A h-th frame may include sub frames, wherein the frequency of the driving signal of a k-th sub frame is different from the frequency of the driving signal of a (k+1)-th sub frame, where k is a natural number.

The second period of the (k+1)-th sub frame may be greater than the second period of the k-th sub frame.

The second period of the (k+1)-th sub frame may be less than the second period of the k-th sub frame.

A h-th frame may include first sub frames, and second sub frames respectively following the first sub frames, wherein the frequency of the driving signal of the first sub frames and the frequency of the driving signal of the second sub frames are different from each other.

Each of the first and second sub frames may include at least one pulse.

According to one or more embodiments, an input-sensing part may include first sensing electrodes configured to receive a driving signal having variable frequency, and second sensing electrodes insulated from the first sensing electrodes, extending to cross the first sensing electrodes, and configured to output a sensing signal, wherein a cycle of the driving signal is defined by a first period of a first signal, and a second period of a second signal following the first signal and lower in level than the first signal, and wherein, when the frequency of the driving signal changes, the first period is constant, and the second period changes to be greater than or equal to the first period.

According to one or more embodiments, a display device may include a display panel, and an input-sensing part on the display panel, and including first sensing electrodes configured to receive a driving signal having variable frequency, and second sensing electrodes insulated from the first sensing electrodes, extending to cross the first sensing electrodes, and configured to output a sensing signal, wherein a cycle of the driving signal is defined by a first period of a first signal, and a second period of a second signal following the first signal and lower in level than the first signal, and wherein, when the frequency of the driving signal changes, the first period is fixed and the period of second signal changes.

BRIEF DESCRIPTION OF THE FIGURES

The above and other aspects of the present disclosure will become apparent by describing in detail embodiments thereof with reference to the accompanying drawings.

FIG. 1 is a view illustrating the interior of a vehicle in which there is located a display device according to one or more embodiments of the present disclosure.

FIG. 18 is a timing diagram illustrating how a frequency of a driving signal changes, according to one or more embodiments of the present disclosure.

FIG. 19 is a timing diagram illustrating how a frequency of a driving signal changes, according to one or more embodiments of the present disclosure.

DETAILED DESCRIPTION

Figure 2:
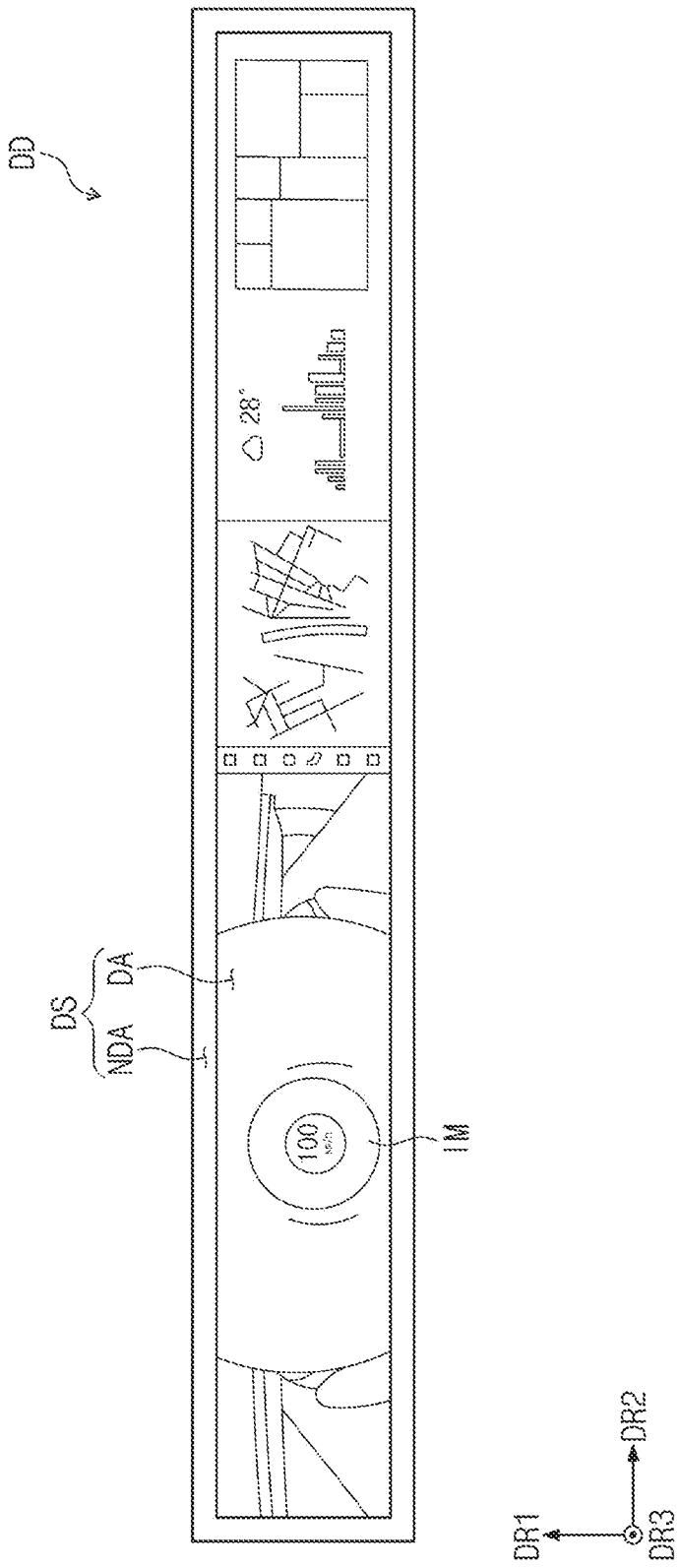
FIG. 2 is a plan view of a display device illustrated in FIG. 1.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions, such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression, such as "at least one of A and B" may include A, B, or A and B. As used herein, "or" generally means "and/or," and the term "and/or" includes any and all combinations of one or more of the associated listed items. For example, the expression, such as "A and/or B" may include A, B, or A and B. Similarly, expressions, such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a view illustrating the interior of a vehicle in which there is located a display device according to one or more embodiments of the present disclosure. FIG. 2 is a plan view of a display device illustrated in FIG. 1.

Referring to FIG. 1, a display device DD may be located within an automobile AM. The display device DD may be located within the automobile AM, and may provide, to a driver US (hereinafter referred to as a "user"), a variety of information. The display device DD may provide the user US with information, such as a speed, weather information, or a map. The display device DD may be defined as a touch display that operates depending on a touch input of the user US.

Referring to FIGS. 1 and 2, the display device DD according to one or more embodiments of the present disclosure may be in the shape of a quadrangle having short sides (or edges) extending in a first direction DR1, and long sides (or edges) extending in a second direction DR2 intersecting the first direction DR1. However, the present disclosure is not limited thereto. For example, the display device DD may have various shapes, such as a circle and a polygon.

Hereinafter, a direction that is substantially perpendicular to a plane defined by the first direction DR1 and the second direction DR2 is defined as a third direction DR3. Also, in the specification, the expression "when viewed from above a plane" means a state of being viewed in the third direction DR3.

An upper surface of the display device DD, through which an image is provided to the user US, may be defined as a display surface DS, and may have a plane defined by the first direction DR1 and the second direction DR2. Images IM generated by the display device DD may be provided to the user US through the display surface DS. The display device DD may sense a touch of the user US.

The display surface DS may include a display area DA, and a non-display area NDA around the display area DA. The display area DA may display an image, and the non-display area NDA may not display an image. The non-display area NDA may surround the display area DA, and may define a border of the display device DD printed with a given color.

The display device DD for an automobile is illustrated as an example, but the present disclosure is not limited thereto. For example, the display device DD according to one or more embodiments of the present disclosure may be used in an electronic device, which provides a user with an image, such as a smartphone, a digital camera, a notebook computer, a monitor, or a smart television.

Figure 3:
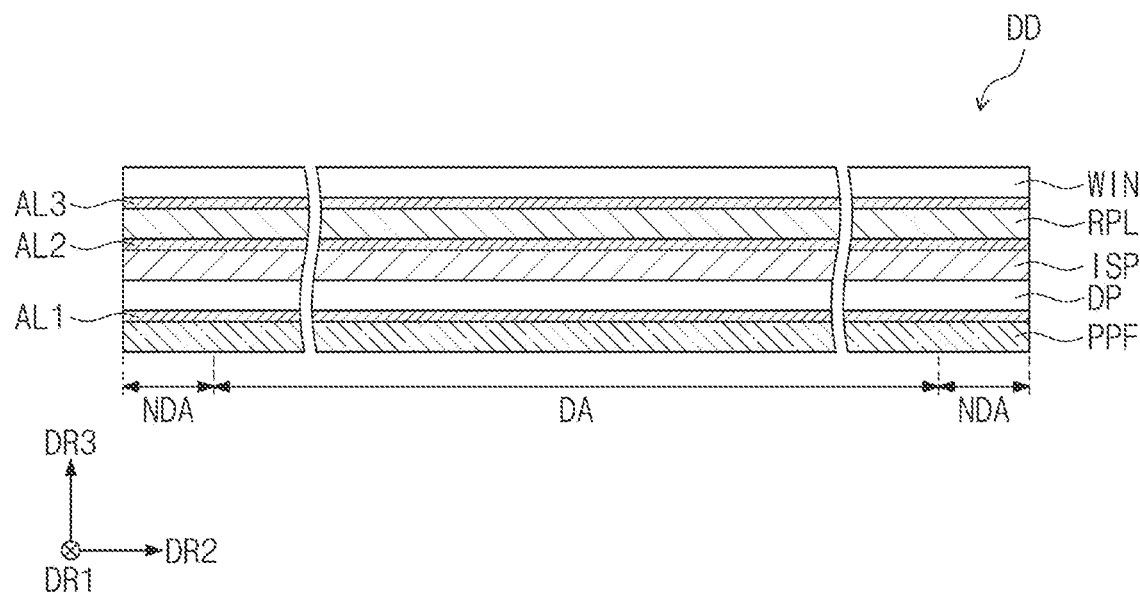
FIG. 3 is a view illustrating a cross-section of a display device illustrated in FIG. 2.

FIG. 3 is a view illustrating a cross-section of a display device illustrated in FIG. 2.

The cross-section of the display device DD, which is viewed in the first direction DR1, is illustrated in FIG. 3.

Referring to FIG. 3, the display device DD may include a display panel DP, an input-sensing part ISP, a reflection-preventing layer RPL, a window WIN, a panel-protecting film PPF, and first to third adhesive layers AL1 to AL3.

The display panel DP according to one or more embodiments of the present disclosure may be a light-emitting display panel, but is not particularly limited thereto. For example, the display panel DP may be an organic light-emitting display panel or an inorganic light-emitting display panel. An emissive layer of the organic light-emitting display layer may include an organic light-emitting material. An emissive layer of the inorganic light-emitting display panel may include a quantum dot, a quantum rod, or the like. Below, the description will be given under the condition that the display panel DP is an organic light-emitting display panel.

The input-sensing part ISP may be located on the display panel DP. The input-sensing part ISP may include a plurality of sensing parts for sensing an external input in a capacitive manner. The input-sensing part ISP may be manufactured directly on the display panel DP when the display device DD is manufactured. However, the present disclosure is not limited thereto. For example, the input-sensing part ISP may be manufactured with a panel independent of the display panel DP, and then may be attached to the display panel DP by an adhesive layer.

The reflection-preventing layer RPL may be located on the input-sensing part ISP. The reflection-preventing layer RPL may be defined as a film for reducing or preventing an external light from being reflected. The reflection-preventing layer RPL may reduce the reflectance of the external light incident to the display panel DP from above the display device DD.

When the external light traveling toward the display panel DP is reflected from the display panel DP, and is again provided to an external user, like a mirror, the user may visually perceive the external light. To reduce or prevent the above phenomenon, in one or more embodiments, the reflection-preventing layer RPL may include a plurality of color filters for displaying the same color as pixels of the display panel DP.

The color filters may filter the external light with the same color as the pixels. In this case, the external light may not be visually perceived by the user. However, the present disclosure is not limited thereto. For example, the reflection-preventing layer RPL may include a retarder and/or a polarizer for the purpose of reducing the reflectance of the external light.

The window WIN may be located on the reflection-preventing layer RPL. The window WIN may protect the display panel DP, the input-sensing part ISP, and the reflection-preventing layer RPL from external scratches and impacts.

The panel-protecting film PPF may be located under the display panel DP. The panel-protecting film PPF may protect a bottom surface of the display panel DP. The panel-protecting film PPF may include a flexible plastic material, such as polyethyleneterephthalate (PET).

The first adhesive layer AL1 may be interposed between the display panel DP and the panel-protecting film PPF. The display panel DP and the panel-protecting film PPF may be tightly coupled to each other by the first adhesive layer AL1.

The second adhesive layer AL2 may be interposed between the reflection-preventing layer RPL and the input-sensing part ISP. The reflection-preventing layer RPL and the input-sensing part ISP may be tightly coupled to each other by the second adhesive layer AL2.

The third adhesive layer AL3 may be interposed between the window WIN and the reflection-preventing layer RPL. The window WIN and the reflection-preventing layer RPL may be tightly coupled to each other by the third adhesive layer AL3.

Figure 4:
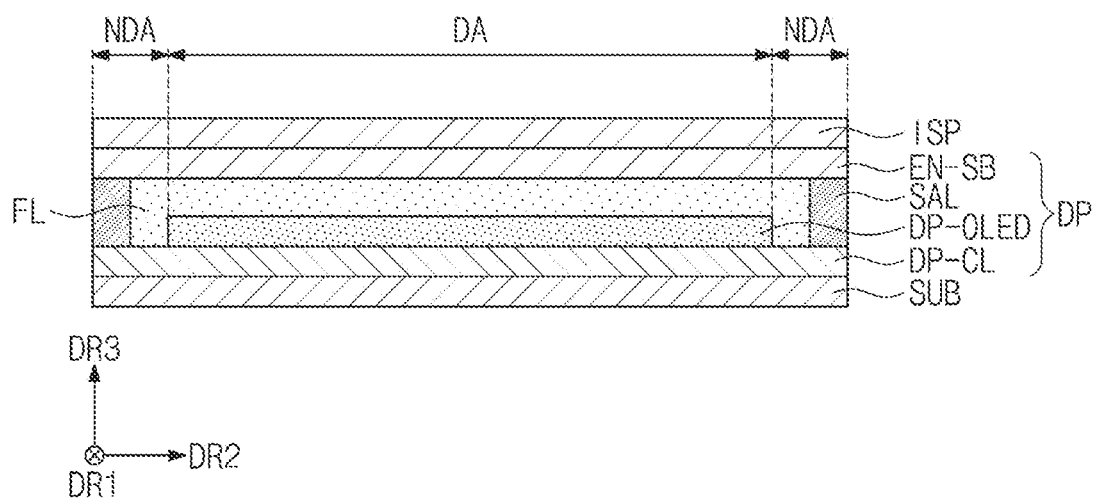
FIG. 4 is a view illustrating a cross-section of a display panel illustrated in FIG. 3.

FIG. 4 is a view illustrating a cross-section of a display panel illustrated in FIG. 3.

In one or more embodiments, the cross-section of the display panel DP, which is viewed in the first direction DR1, is illustrated in FIG. 4, and the input-sensing part ISP is illustrated together with the display panel DP.

Referring to FIG. 4, the display panel DP may include a substrate SUB, a circuit element layer DP-CL, a display element layer DP-OLED, an encapsulation substrate EN-SB, a sealing layer SAL, and a filler FL. The circuit element layer DP-CL may be located on the substrate SUB. The display element layer DP-OLED may be located on the circuit element layer DP-CL.

A plurality of pixels may be located in the circuit element layer DP-CL and the display element layer DP-OLED. Each of the pixels may include transistors that are located in the circuit element layer DP-CL, and light-emitting elements that are located in the display element layer DP-OLED and that are respectively connected with the transistors.

The substrate SUB may include the display area DA, and the non-display area NDA around the display area DA. The display element layer DP-OLED may be located in the display area DA. The encapsulation substrate EN-SB may be located on the display element layer DP-OLED. The substrate SUB and the encapsulation substrate EN-SB may be of a rigid type. According to the above structure, the display panel DP may be of a rigid type.

The sealing layer SAL may be interposed between the substrate SUB and the encapsulation substrate EN-SB. The sealing layer SAL may be located in the non-display area NDA. The sealing layer SAL may tightly couple the substrate SUB and the encapsulation substrate EN-SB. The display element layer DP-OLED may be sealed between the substrate SUB and the encapsulation substrate EN-SB by the sealing layer SAL. The sealing layer SAL may include a photo-curable material.

The filler FL may be interposed between the substrate SUB and the encapsulation substrate EN-SB. The filler FL may be located in a space that is sealed between the substrate SUB and the encapsulation substrate EN-SB by the sealing layer SAL. The filler FL may include a thermosetting material.

The input-sensing part ISP may be directly located on the display panel DP. For example, the input-sensing part ISP may be directly located on the encapsulation substrate EN-SB.

Figure 5:
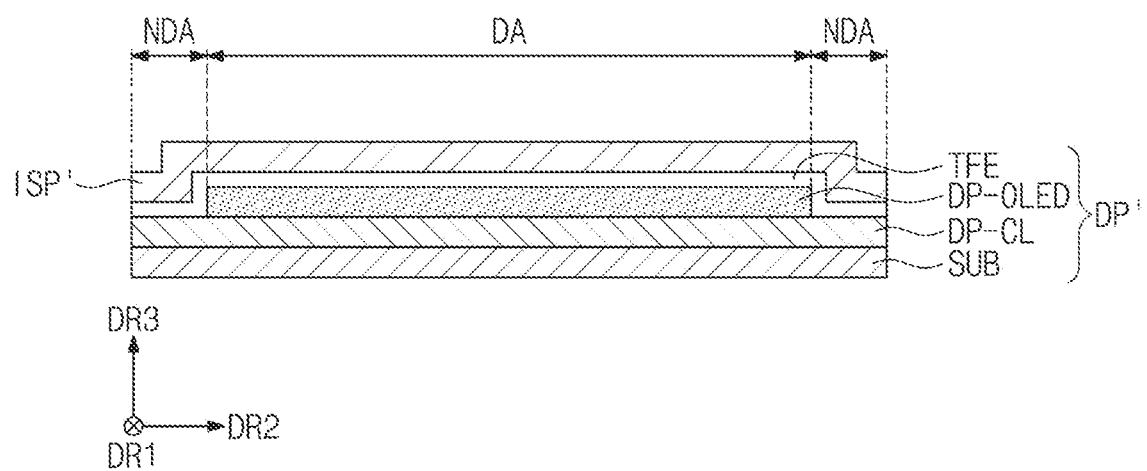
FIG. 5 is a view illustrating a cross-section of a display panel according to one or more embodiments of the present disclosure.

FIG. 5 is a view illustrating a cross-section of a display panel according to one or more embodiments of the present disclosure.

In one or more embodiments, an input-sensing part ISP' is illustrated in FIG. together with a display panel DP'.

Referring to FIG. 5, the display panel DP' may include the circuit element layer DP-CL located on the substrate SUB, the display element layer DP-OLED located on the circuit element layer DP-CL, and a thin film encapsulation layer TFE located on the display element layer DP-OLED.

The display panel DP may be a flexible display panel. For example, the substrate SUB may include a flexible plastic material, such as polyimide. A layout structure of the circuit element layer DP-CL and the display element layer DP-OLED may be identical to the layout structure of the circuit element layer DP-CL and the display element layer DP-OLED illustrated in FIG. 4.

The thin film encapsulation layer TFE may be located on the circuit element layer DP-CL so as to cover the display element layer DP-OLED. The thin film encapsulation layer TFE may include inorganic layers, and an organic layer between the inorganic layers. The inorganic layers may protect the pixels from moisture/oxygen. The organic layer may protect the pixels from foreign objects, such as dust particles.

The input-sensing part ISP' may be directly located on the display panel DP'. For example, the input-sensing part ISP' may be directly located on the thin film encapsulation layer TFE.

Figure 6:
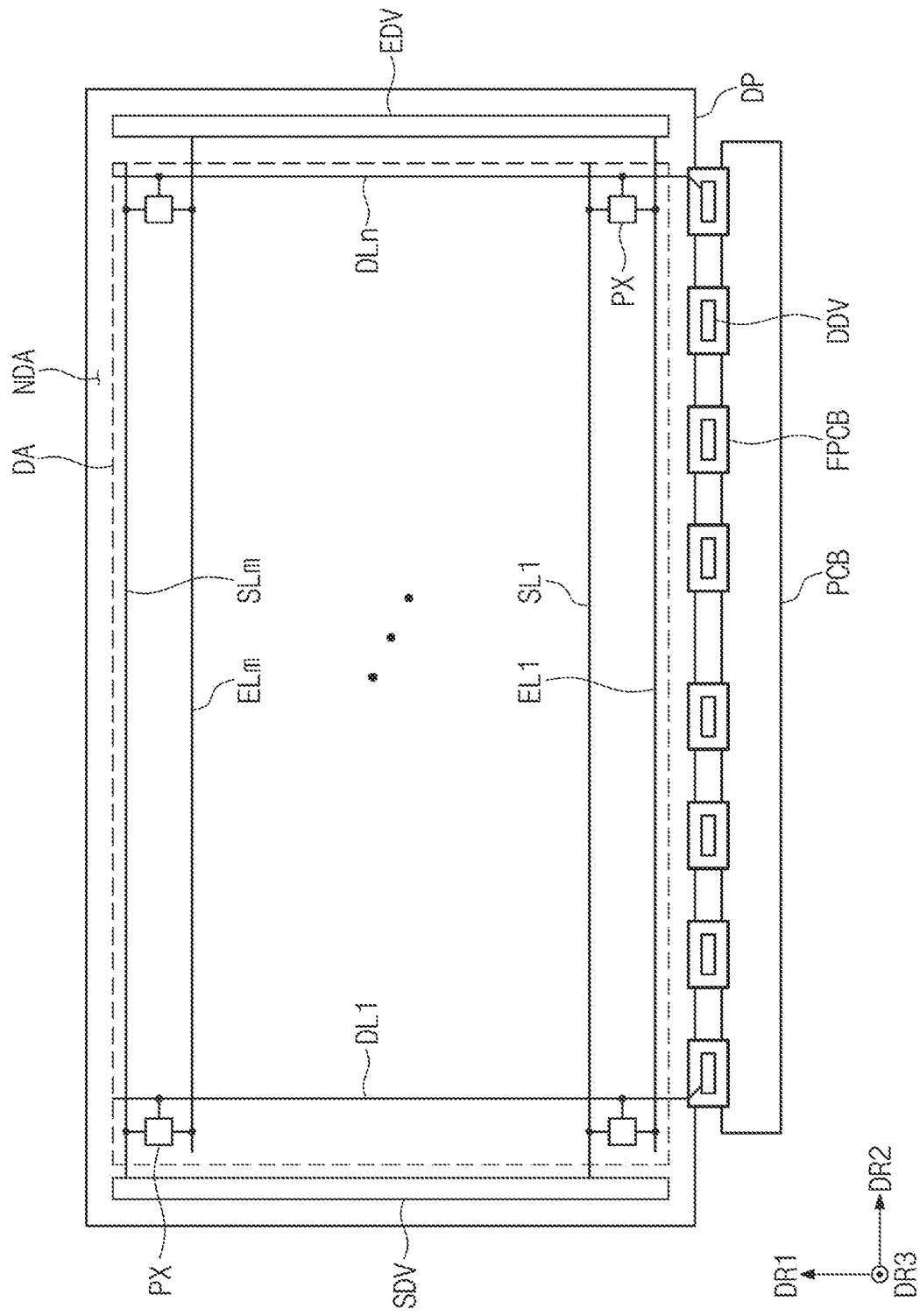
FIG. 6 is a plan view of a display panel illustrated in FIG. 3.

FIG. 6 is a plan view of a display panel illustrated in FIG. 3.

Referring to FIG. 6, the display device DD may include the display panel DP, a scan driver SDV, a plurality of data drivers DDV, a plurality of flexible circuit boards FPCB, an emission driver EDV, and a printed circuit board PCB.

The display panel DP may include the display area DA, and the non-display area NDA around the display area DA. The display area DA and the non-display area NDA of the display panel DP may respectively correspond to the display area DA and the non-display area NDA illustrated in FIG. 2. The display panel DP may be in the shape of a rectangle having long sides (or edges) extending in the second direction DR2, and short sides (e.g., edges) extending in the first direction DR1. However, the shape of the display panel DP is not limited thereto.

The display panel DP may include a plurality of pixels PX, a plurality of scan lines SL1 to SLm, a plurality of data lines DL1 to DLn, and a plurality of emission lines EL1 to ELm. Herein, m and n are natural numbers.

The pixels PX may be arranged in the display area DA. The scan driver SDV and the emission driver EDV may be located in the non-display area NDA so as to be adjacent to the respective short sides of the display panel DP.

When viewed from above a plane (e.g., when viewed in plan view), the data drivers DDV may be located adjacent to a lower side of the display panel DP, which is defined as one of the long sides of the display panel DP. When viewed from above a plane (e.g., when viewed in plan view), the printed circuit board PCB may be located adjacent to the lower side of the display panel DP. The flexible circuit boards FPCB may be connected with the lower side of the display panel DP and the printed circuit board PCB. The data drivers DDV may be manufactured in the form of an integrated circuit chip, and may be respectively mounted on the flexible circuit boards FPCB.

The scan lines SL1 to SLm may extend in the second direction DR2, and may be connected with the pixels PX and the scan driver SDV. The emission lines EL1 to ELm may extend in the second direction DR2, and may be connected with the pixels PX and the emission driver EDV.

The data lines DL1 to DLn may extend in the first direction DR1, and may be connected with the pixels PX and the data drivers DDV. In one or more embodiments, two data lines DL1 and DLn connected with the data drivers DDV respectively located on the leftmost side and the rightmost side are illustrated. However, a plurality of additional data lines may be connected with each of the respective data drivers DDV.

In one or more embodiments, the display device DD may further include a timing controller for controlling operations of the scan driver SDV, the data drivers DDV, and the emission driver EDV. The timing controller may be manufactured in the form of an integrated circuit chip and may be mounted on the printed circuit board PCB. The timing controller may be connected with the scan driver SDV, the data drivers DDV, and the emission driver EDV through the printed circuit board PCB and the flexible circuit boards FPCB.

The scan driver SDV may generate a plurality of scan signals, and the scan signals may be applied to the pixels PX through the scan lines SL1 to SLm. The data drivers DDV may generate a plurality of data voltages, and the data voltages may be applied to the pixels PX through the data lines DL1 to DLn. The emission driver EDV may generate a plurality of emission signals, and the emission signals may be applied to the pixels PX through the emission lines EL1 to ELm.

The pixels PX may receive the data voltages in response to the scan signals. The pixels PX may display images by emitting a light of luminance corresponding to the data voltages in response to the emission signals. The emission time of the pixels PX may be controlled by the emission signals.

Figure 7:
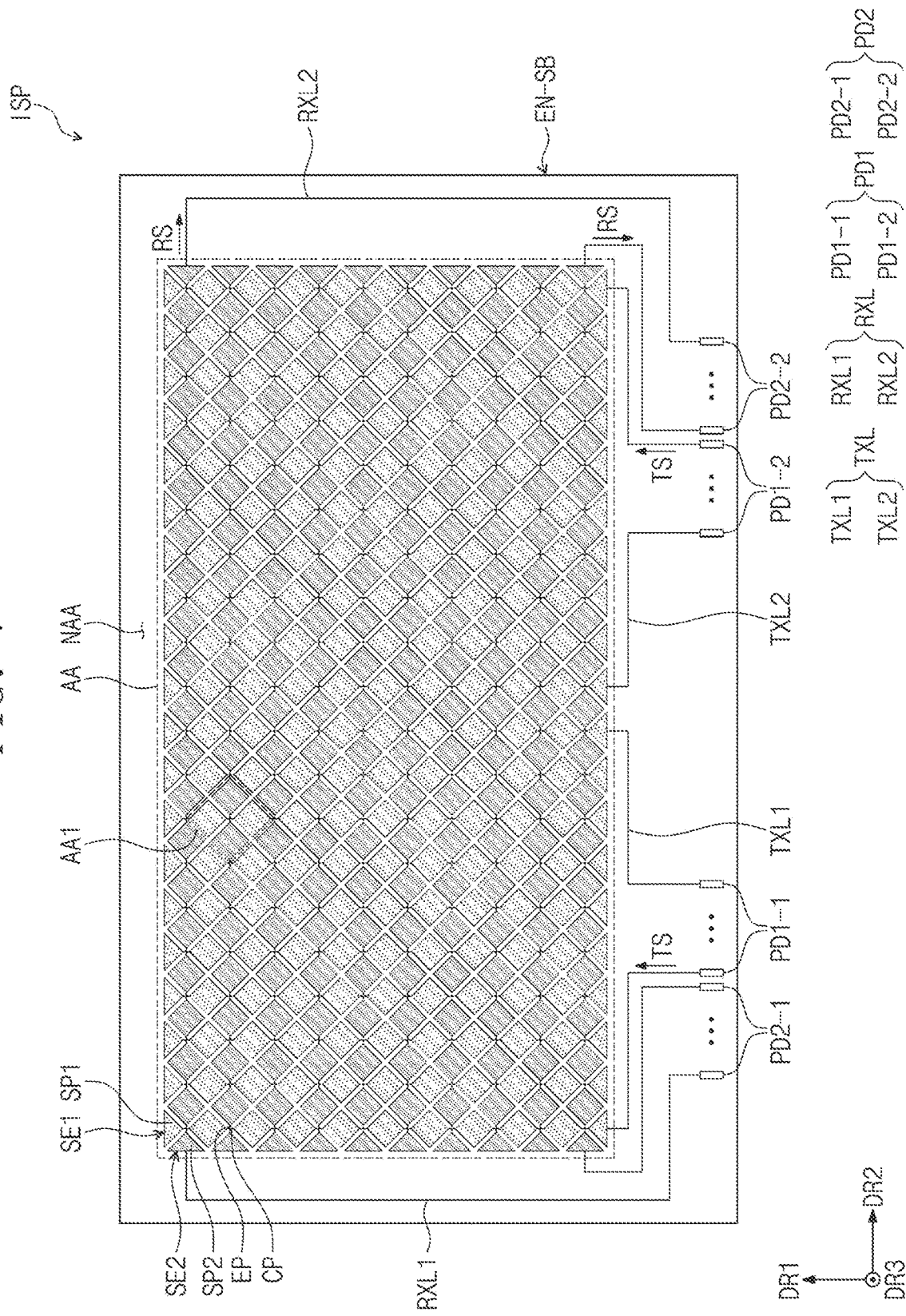
FIG. 7 is a plan view of an input-sensing part illustrated in FIG. 3.

FIG. 7 is a plan view of an input-sensing part illustrated in FIG. 3.

Referring to FIG. 7, the input-sensing part ISP may include a plurality of sensing electrodes SE1 and SE2, a plurality of sensing lines TXL and RXL, a plurality of first pads PD1, and a plurality of second pads PD2. The sensing electrodes SE1 and SE2, the sensing lines TXL and RXL, and the first and second pads PD1 and PD2 may be located on the encapsulation substrate EN-SB.

When viewed from above a plane (e.g., when viewed in plan view), a planar area of the input-sensing part ISP may include an active area AA, and a non-active area NAA around the active area AA. The non-active area NAA may surround the active area AA. When viewed from above a plane (e.g., when viewed in plan view), the active area AA may overlap the display area DA, and the non-active area NAA may overlap the non-display area NDA.

The sensing electrodes SE1 and SE2 may be located in the active area AA. The first and second pads PD1 and PD2 may be located in the non-active area NAA (hereinafter referred to as a "lower-side non-active area), and may be located adjacent to a lower side of the active area AA, when viewed from above a plane. The first and second pads PD1 and PD2 may be distributed, and may be located on the left side and the right side with respect to the center of the lower-side non-active area NAA.

The first pads PD1 may include a plurality of (1-1)-th pads PD1-1 and a plurality of (1-2)-th pads PD1-2. The second pads PD2 may include a plurality of (2-1)-th pads PD2-1 and a plurality of (2-2)-th pads PD1-2.

The (1-1)-th pads PD1-1 and the (2-1)-th pads PD2-1 may be located on the left side with respect to the center of the lower-side non-active area NAA. The (1-2)-th pads PD1-2 and the (2-2)-th pads PD2-2 may be located on the right side with respect to the center of the lower-side non-active area NAA.

In the lower-side non-active area NAA, the (2-1)-th pads PD2-1 may be located closer to the outside than the (1-1)-th pads PD1-1 with respect to the second direction DR2, and the (2-2)-th pads PD2-2 may be located closer to the outside than the (1-2)-th pads PD1-2 with respect to the second direction DR2. The (1-1)-th pads PD1-1 and the (1-2)-th pads PD1-2 may be located between the (2-1)-th pads PD2-1 and the (2-2)-th pads PD2-2.

The sensing lines TXL and RXL may be connected with the sensing electrodes SE1 and SE2, and may extend to the non-active area NAA so as to be connected with the first and second pads PD1 and PD2. In one or more embodiments, a sensing-control part for controlling the input-sensing part ISP may be connected with the first and second pads PD1 and PD2.

The sensing electrodes SE1 and SE2 may include the plurality of first sensing electrodes SE1 that extend in the first direction DR1 and that are arranged in the second direction DR2, and the plurality of second sensing electrodes SE2 that extend in the second direction DR2 and are arranged in the first direction DR1. The second sensing electrodes SE2 may be insulated from the first sensing electrodes SE1 and may extend to intersect, or cross, the first sensing electrodes SE1.

The sensing lines TXL and RXL may include the plurality of first sensing lines TXL connected with the first sensing electrodes SE1, and the plurality of second sensing lines RXL connected with the second sensing electrodes SE2. The first sensing lines TXL may be connected with one ends of the first sensing electrodes SE1, which may be adjacent to the lower-side non-active area NAA. The second sensing lines RXL may be connected with respective opposite ends of the second sensing electrodes SE2. The opposite ends of the second sensing electrodes SE2 may face away from each other with respect to the second direction DR2.

The first sensing lines TXL may extend to the non-active area NAA, and may be connected with the first pads PD1. The first sensing lines TXL may extend to the lower-side non-active area NAA.

The sensing lines RXL may extend to the non-active area NAA, and may be connected with the second pads PD2. The second sensing lines RXL may extend in the non-active area NAA (e.g., to the lower-side non-active area NAA adjacent to opposite sides of the active area AA, which face away from each other with respect to the second direction DR2).

The first sensing lines TXL may include a plurality of first transmission lines TXL1 and a plurality of second transmission lines TXL2. The first transmission lines TXL1 may be connected with some of the first sensing electrodes SE1 and the (1-1)-th pads PD1-1. In one or more embodiments, the first transmission lines TXL1 may be connected with one ends of the first sensing electrodes SE1 located on the left side with respect to the center of the active area AA.

The second transmission lines TXL2 may be connected with others of the first sensing electrodes SE1 and the (1-2)-th pads PD1-2. In one or more embodiments, the second transmission lines TXL2 may be connected with one ends of the first sensing electrodes SE1 located on the right side with respect to the center of the active area AA.

The second sensing lines RXL may include a plurality of first reception lines RXL1 and a plurality of second reception lines RXL2. The first reception lines RXL1 may be connected with one/first ends of the second sensing electrodes SE2 and the (2-1)-th pads PD2-1. In one or more embodiments, the first reception lines RXL1 may be located in the non-active area NAA (hereinafter referred to as a "left-side non-active area") adjacent to the left side of the active area AA, when viewed from above a plane. The one/first ends of the second sensing electrodes SE2 may be adjacent to the left-side non-active area NAA.

The second reception lines RXL2 may be connected with opposite/second ends of the second sensing electrodes SE2 and the (2-2)-th pads PD2-2. In one or more embodiments, the second reception lines RXL2 may be located in the non-active area NAA (hereinafter referred to as a "right-side non-active area") adjacent to the right side of the active area AA, when viewed from above a plane. The opposite/second ends of the second sensing electrodes SE2 may be adjacent to the right-side non-active area NAA.

Driving signals TS may be applied to the first sensing electrodes SE1 through the first sensing lines TXL. The driving signals TS may be applied to the first sensing electrodes SE1 every frame. A change in a capacitance formed between the first and second sensing electrodes SE1 and SE2 may be output through the second sensing lines RXL as a sensing signal RS.

The driving signal TS may be generated and may be output by the sensing-control part. The sensing signal RS may be provided to the sensing-control part as an output signal. The sensing-control part may calculate touch coordinates by using the sensing signal RS.

Each of the first sensing electrodes SE1 may include a plurality of first sensing parts SP1 arranged in the first direction DR1, and a plurality of connecting patterns CP connecting the first sensing parts SP1. Each of the connecting patterns CP may be interposed between a respective pair of first sensing parts SP1 that are adjacent in the first direction DR1 to connect the two first sensing parts SP1.

Each of the second sensing electrodes SE2 may include a plurality of second sensing parts SP2 arranged in the second direction DR2, and a plurality of extending patterns EP extended from the second sensing parts SP2. In each of the second sensing electrodes SE2, the extending patterns EP and the second sensing parts SP2 may be integrally formed. Each of the extending patterns EP may be interposed between a respective pair second sensing parts SP2 that are adjacent in the second direction DR2, and may extend from the two second sensing parts SP2.

When viewed from above a plane (e.g., when viewed in plan view), the extending patterns EP may extend to intersect, or cross, the connecting patterns CP. The first sensing parts SP1 and the second sensing parts SP2 may not overlap each other, and may be spaced from each other, in which case the first sensing parts SP1 and the second sensing parts SP2 may be alternately located. Capacitances may be formed by the first sensing parts SP1 and the second sensing parts SP2. The first and second sensing parts SP1 and SP2 and the extending patterns EP may be located in the same layer. The connecting patterns CP may be located in a layer that is different from that of the first and second sensing parts SP1 and SP2 and the extending patterns EP.

Figure 8:
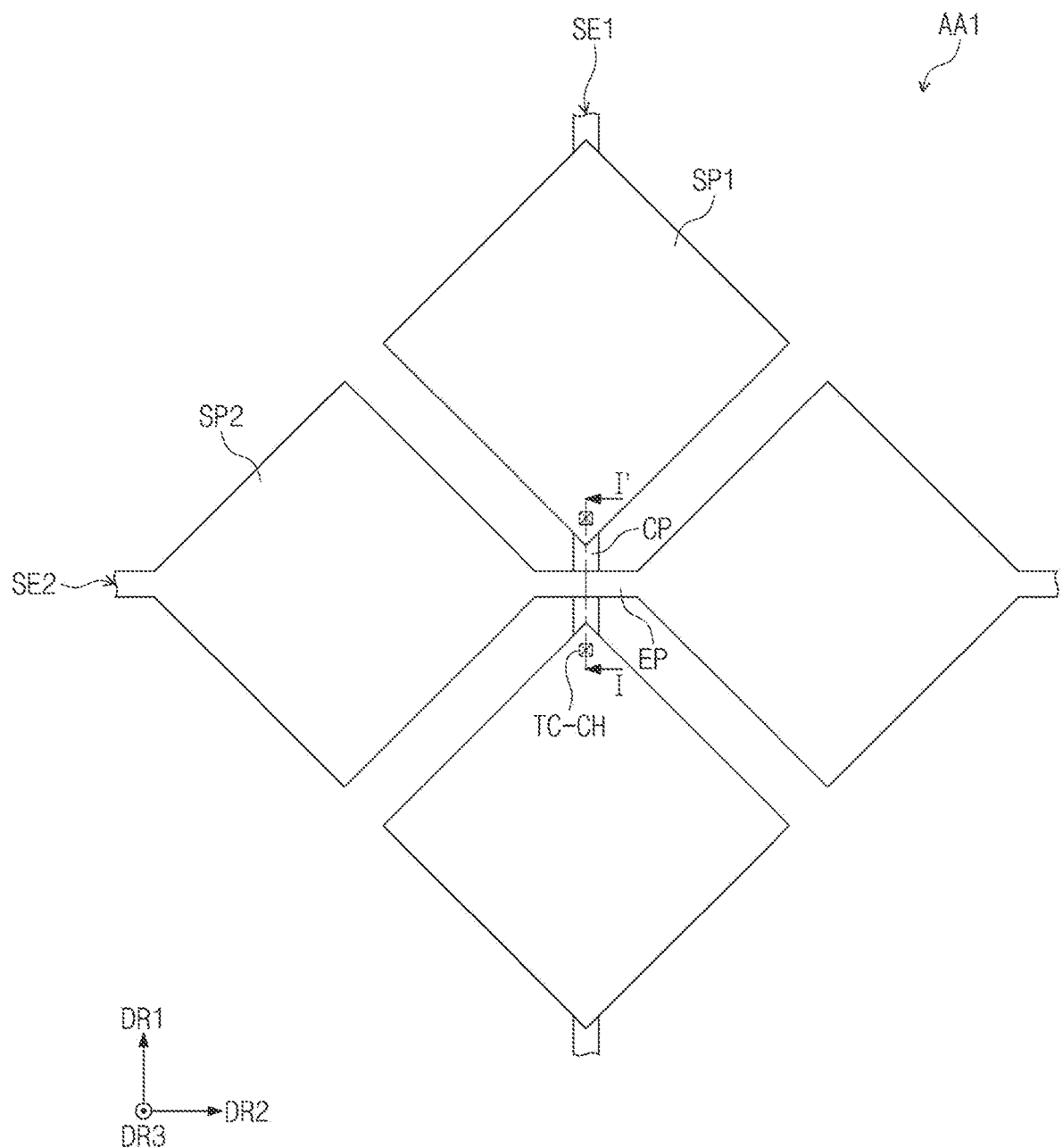
FIG. 8 is an enlarged view of area AA1 illustrated in FIG. 7.

FIG. 8 is an enlarged view of area AA1 illustrated in FIG. 7.

Two first sensing parts adjacent to each other and two second sensing parts adjacent to each other are illustrated in FIG. 8 as an example.

Referring to FIG. 8, the first sensing electrode SE1 may include a pair of first sensing parts SP1 arranged in the first direction DR1, and a connecting pattern CP located between the first sensing parts SP1 and connecting the first sensing parts SP1. An insulating layer (illustrated in FIG. 9) may be located between the connecting pattern CP and the first sensing parts SP1, and the connecting pattern CP may be connected with the first sensing parts SP1 through contact holes TC-CH defined in the insulating layer.

The second sensing electrode SE2 may include a pair of second sensing parts SP2 arranged in the second direction DR2, and an extending pattern EP located between the second sensing parts SP2 and extended from the second sensing parts SP2. The extending pattern EP may be insulated from the connecting pattern CP, and may extend to intersect, or cross, the connecting pattern CP. The extending pattern EP may be integrally formed with the second sensing parts SP2.

The first and second sensing parts SP1 and SP2 may be located in the same layer as the extending pattern EP. The connecting pattern CP may be located in a layer that is different from the layer where the first and second sensing parts SP1 and SP2 and the extending pattern EP are located.

Figure 9:
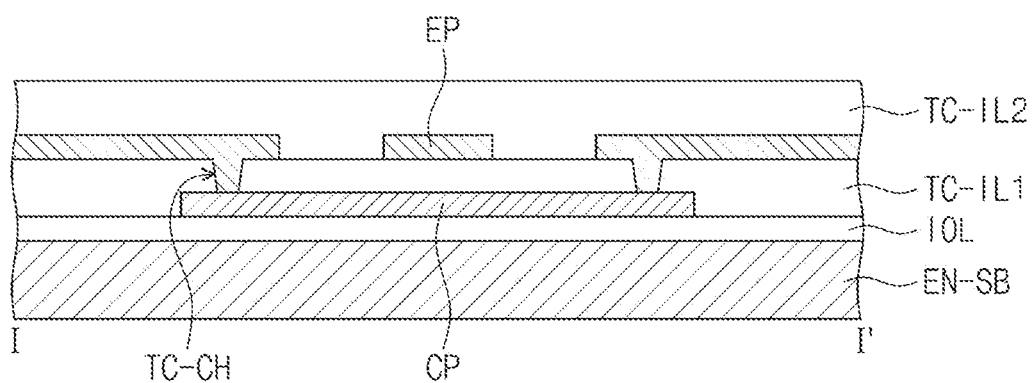
FIG. 9 is a cross-sectional view taken along the line I-I' of FIG. 8.

FIG. 9 is a cross-sectional view taken along the line I-I' of FIG. 8.

Referring to FIGS. 8 and 9, an insulating layer IOL may be located on the encapsulation substrate EN-SB. The connecting pattern CP may be located on the insulating layer IOL. A first insulating layer TC-IL1 may be located on the connecting patterns CP. The first insulating layer TC-IL1 may be located on the insulating layer IOL to cover the connecting pattern CP.

The first sensing parts SP1 and the extending patterns EP may be located on the first insulating layer TC-IL1. In one or more embodiments, the second sensing parts SP2 that are located in the same layer as the extending patterns EP may be located on the first insulating layer TC-IL1.

The first sensing parts SP1 may be connected with the connecting pattern CP through the contact holes TC-CH that are defined in the first insulating layer TC-IL1. Accordingly, the first sensing parts SP1 may be connected with each other by the connecting pattern CP.

A second insulating layer TC-IL2 may be located on the first sensing parts SP1 and on the extending pattern EP. The second insulating layer TC-IL2 may be located on the first insulating layer TC-IL1 to cover the first sensing parts SP1 and the extending patterns EP. The second insulating layer TC-IL2 may be located on the first insulating layer TC-IL1 to cover the second sensing parts SP2.

Figure 10:
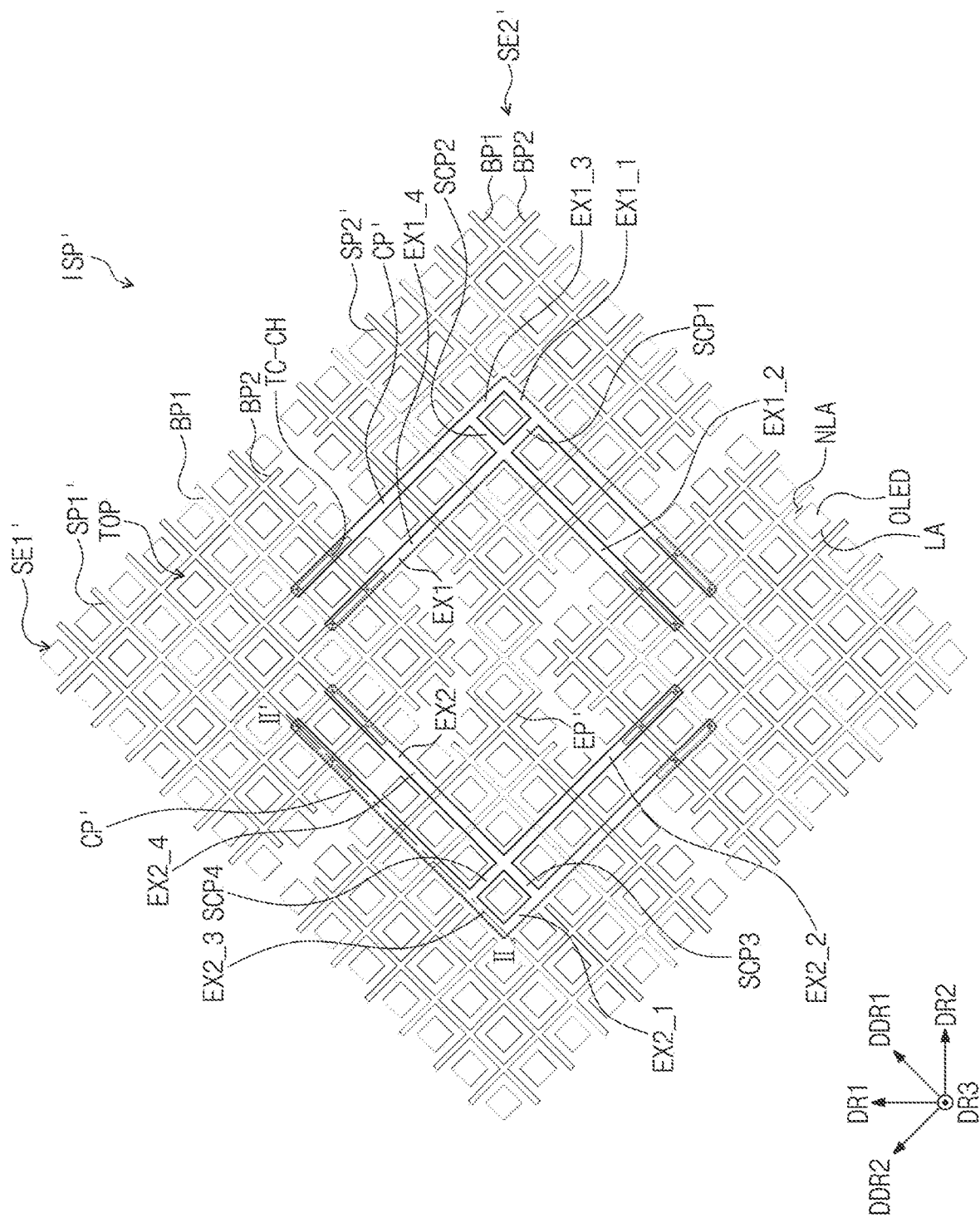
FIG. 10 is a view illustrating first and second sensing parts, a connecting pattern, and an extending pattern of an input-sensing part illustrated in FIG. 5.
Figure 11:
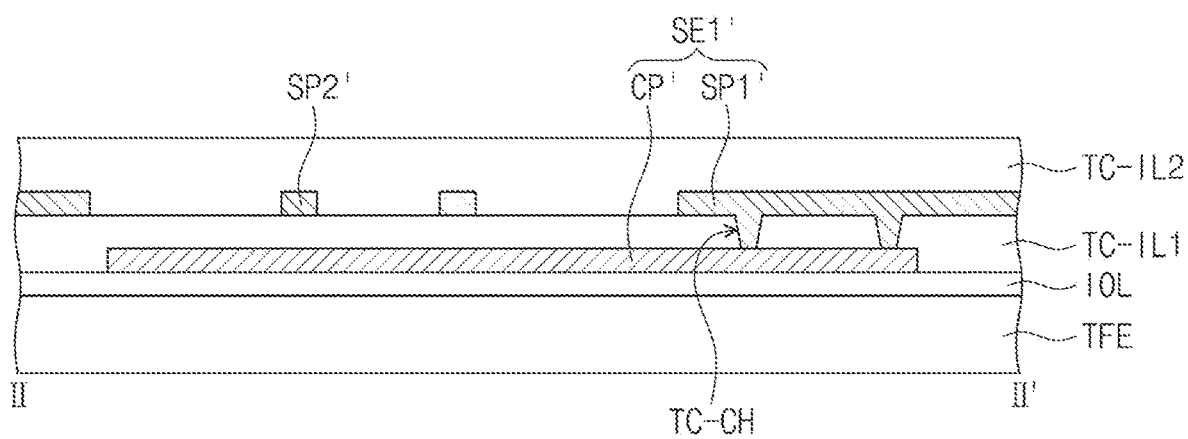
FIG. 11 is a cross-sectional view taken along the line II-II' of FIG. 10.

FIG. 10 is a view illustrating first and second sensing parts, a connecting pattern, and an extending pattern of an input-sensing part illustrated in FIG. 5. FIG. 11 is a cross-sectional view taken along the line II-II' of FIG. 10.

In one or more embodiments, FIG. 10 shows a plan view corresponding to FIG. 8.

In one or more embodiments, a plane structure of an input-sensing part ISP' illustrated in FIG. 10 may be substantially identical to the input-sensing part ISP illustrated in FIG. 7.

Referring to FIGS. 5 and 10, the input-sensing part ISP' may include the configuration illustrated in FIG. 10 in plurality. The input-sensing part ISP' may include first and second sensing electrodes SE1' and SE2'. The first and second sensing electrodes SE1' and SE2' may be located on the thin film encapsulation layer TFE illustrated in FIG. 5.

The first sensing electrode SE1' may include first sensing parts SP1', and a connecting pattern CP' located between the first sensing parts SP1'. The second sensing electrode SE2' may include second sensing parts SP2', and an extending pattern EP' located between the second sensing parts SP2'.

The first sensing parts SP1' and the second sensing electrode SE2' may have a mesh shape. To have the mesh shape, each of the first and second sensing parts SP1' and SP2' may include a plurality of first branch portions BP1 extending in a first diagonal direction DDR1, and a plurality of second branch portions BP2 extending in a second diagonal direction DDR2.

The first diagonal direction DDR1 may be defined as a direction intersecting the first and second directions DR1 and DR2 on a plane defined by the first and second directions DR1 and DR2. The second diagonal direction DDR2 may be defined as a direction intersecting the first diagonal direction DDR1 on the plane defined by the first and second directions DR1 and DR2. In one or more embodiments, the first direction DR1 and the second direction DR2 may be perpendicular to each other, and the first diagonal direction DDR1 and the second diagonal direction DDR2 may cross each other to be perpendicular to each other.

The first branch portions BP1 of each of the first and second sensing parts SP1' and SP2' and the second branch portions BP2 of each of the first and second sensing parts SP1' and SP2' may cross each other, and may be integrally formed with each other. Rhombus-shaped touch openings TOP may be defined by the first branch portions BP1 and the second branch portions BP2.

When viewed from above a plane (e.g., when viewed in plan view), light-emitting areas LA may be located within the touch openings TOP. Light-emitting elements (e.g., organic light-emitting diodes OLED) of the pixels PX may be located in the light-emitting areas LA. The light generated by the light-emitting elements may be output through the light-emitting areas LA.

The first and second sensing parts SP1' and SP2' may be located in a non-light-emitting area NLA. Because the first and second sensing parts SP1' and SP2' are located in the non-light-emitting areas NLA, the light generated by the light-emitting areas LA may be output normally without the influence of the first and second sensing parts SP1' and SP2'.

The connecting pattern CP' may pass by the second sensing parts SP2' and may extend toward the first sensing parts SP1'. The connecting pattern CP' may extend such that the connecting pattern CP' does not overlap the extending pattern EP', and may connect the first sensing parts SP1'. The connecting pattern CP' may be connected with the first sensing parts SP1' through a plurality of contact holes TC-CH. The structure of the contact holes TC-CH will be described with reference to FIG. 11. The connecting pattern CP' may be located in a layer that is different from that of the extending pattern EP', the first sensing parts SP1', and the second sensing parts SP2'.

The extending pattern EP' may be interposed between the first sensing parts SP1', and may extend from the second sensing part SP2'. The second sensing parts SP2' may be integrated with the extending pattern EP'. The extending pattern EP' may have a mesh shape. When viewed from above a plane (e.g., when viewed in plan view), the extending pattern EP' may not overlap the connecting pattern CP'. The extending pattern EP', the first sensing parts SP1' and the second sensing parts SP2' may be located in the same layer.

The connecting pattern CP' may include a first extension part EX1, and a second extension part EX2 that is symmetrical in shape to the first extension part EX1. The extending pattern EP' may be interposed between the first extension part EX1 and the second extension part EX2.

The first extension part EX1 may extend through an area overlapping one of the second sensing parts SP2', and may be connected with the first sensing parts SP1'. The second extension part EX2 may extend through an area overlapping another of the second sensing parts SP2', and may be connected with the first sensing parts SP1'.

Below, the first sensing parts SP1' are defined as a first upper sensing part SP1' and a first lower sensing part SP1' depending on a relative placement location. Also, the second sensing parts SP2' are defined as a second left sensing part SP2' and a second right sensing part SP2' depending on a relative placement location.

Portions of the first and second extension parts EX1 and EX2, which are adjacent to one/first sides of the first and second extension parts EX1 and EX2, may be connected with the first lower sensing part SP1' through the plurality of contact holes TC-CH. Portions of the first and second extension parts EX1 and EX2, which are adjacent to opposite/second sides of the first and second extension parts EX1 and EX2, may be connected with the first upper sensing part SP1' through the plurality of contact holes TC-CH.

The first extension part EX1 may include a first sub extension part EX1_1 and a second sub extension part EX1_2, which extend in the first diagonal direction DDR1, a third sub extension part EX1_3 and a fourth sub extension part EX1_4, which extend in the second diagonal direction DDR2, a first sub conductive pattern SCP1 extending in the second diagonal direction DDR2, and a second sub conductive pattern SCP2 extending in the first diagonal direction DDR1.

Portions of the first and second sub extension parts EX1_1 and EX1_2, which are adjacent to one/first sides of the first and second sub extension parts EX1_1 and EX1_2, may be connected with the first lower sensing part SP1' through the plurality of contact holes TC-CH. Portions of the third and fourth sub extension parts EX1_3 and EX1_4, which are adjacent to one/first sides of the third and fourth sub extension parts EX1_3 and EX1_4, may be connected with the first upper sensing part SP1' through the plurality of contact holes TC-CH.

An opposite/second side of the first sub extension part EX1_1 may extend from an opposite/second side of the third sub extension part EX1_3, and an opposite/second side of the second sub extension part EX1_2 may extend from an opposite/second side of the fourth sub extension part EX1_4. The first sub conductive pattern SCP1 may extend from the opposite/second side of the fourth sub extension part EX1_4 in the second diagonal direction DDR2, and may extend to the first sub extension part EX1_1. The second sub conductive pattern SCP2 may extend from the opposite/second side of the second sub extension part EX1_2 in the first diagonal direction DDR1, and may extend to the third sub extension part EX1_3.

The first sub extension part EX1_1, the second sub extension part EX1_2, the third sub extension part EX1_3, the fourth sub extension part EX1_4, the first sub conductive pattern SCP1, and the second sub conductive pattern SCP2 may be integrally formed.

The first and second sub extension parts EX1_1 and EX1_2 may extend to intersect, or cross, a given number of second branch portions BP2, which are adjacent to the first lower sensing part SP1', from among the second branch portions BP2 of the second right sensing part SP2'. The first branch portions BP1 of the second right sensing part SP2' may be omitted from some areas overlapping the first and second sub extension parts EX1_1 and EX1_2 and the second sub conductive pattern SCP2.

The third and fourth sub extension parts EX1_3 and EX1_4 may extend to intersect, or cross, a given number of first branch portions BP1, which are adjacent to the first upper sensor part SP1', from among the first branch portions BP1 of the second right sensing part SP2'. The second branch portions BP2 of the second right sensing part SP2' may be omitted from some areas overlapping the third and fourth sub extension parts EX1_3 and EX1_4 and the first sub conductive pattern SCP1.

The second extension part EX2 may include a fifth sub extension part EX2_1 and a sixth sub extension part EX2_2, which extend in the second diagonal direction DDR2, a seventh sub extension part EX2_3 and an eighth sub extension part EX2_4, which extend in the first diagonal direction DDR1, a third sub conductive pattern SCP3 extending in the first diagonal direction DDR1, and a fourth sub conductive pattern SCP4 extending in the second diagonal direction DDR2.

The second left sensing part SP2' may be symmetrical in structure to the second right sensing part SP2', and the second extension part EX2 may be symmetrical in structure to the first extension part EX1. Accordingly, below, additional description associated with the fifth to eighth sub extension parts EX2_1 to EX2_4 and the third and fourth sub conductive patterns SCP3 and SCP4 will be omitted to avoid redundancy.

Referring to FIG. 11, the insulating layer IOL may be located on the thin film encapsulation layer TFE, and the connecting pattern CP' may be located on the insulating layer IOL. The first insulating layer TC-IL1 may be located on the connecting pattern CP' and the insulating layer IOL. The first insulating layer TC-IL1 may be located on the insulating layer IOL to cover the connecting pattern CP'.

The first sensing parts SP1' and the second sensing parts SP2' may be located on the first insulating layer TC-IL1. The extending pattern EP' integrally formed with the second sensing parts SP2' may also be located on the first insulating layer TC-IL1. The connecting pattern CP' may be connected with the first sensing parts SP1' through the plurality of contact holes TC-CH defined in the first insulating layer TC-IL1.

A second insulating layer TC-IL2 may be located on the first and second sensing parts SP1' and SP2' and the first insulating layer TC-IL1. The second insulating layer TC-IL2 may be located on the first insulating layer TC-IL1 so as to cover the first and second sensing parts SP1' and SP2'.

Figure 12:
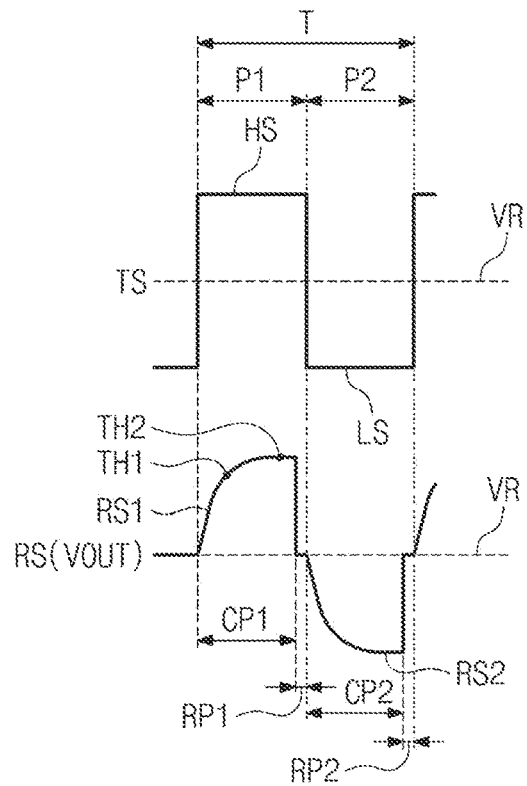
FIG. 12 is a diagram for describing a normal operation period of a driving signal and a sensing signal illustrated in FIG. 7.

FIG. 12 is a diagram for describing a normal operation period of a driving signal and a sensing signal illustrated in FIG. 7.

Referring to FIG. 12, the driving signal TS may include a first signal HS, and a second signal LS following the first signal HS. The first signal HS may have a first level, and the second signal LS may have a second level that is lower than the first level.

The first signal HS may have a level that is higher than a reference voltage VR, and the second signal LS may have a level that is lower than the reference voltage VR. The first signal HS may be defined as a positive polarity voltage based on the reference voltage VR, and the second signal LS may be defined as a negative polarity voltage based on the reference voltage VR.

The first signal HS may be maintained during a first period P1, and the second signal LS may be maintained during a second period P2. A cycle "T" of the driving signal TS may include the first period P1 and the second period P2. That is, the cycle "T" may be defined by the first period P1 of the first signal HS (e.g., a first amount of time during which the first signal HS is output), and by the second period P2 of the second signal LS (e.g., a second amount of time during which the second signal LS is output).

The first signal HS and the second signal LS may be defined by a period for normally performing a sensing operation. For example, the sensing signal RS may be charged along the driving signal TS. The sensing signal RS may be defined as an output signal VOUT. The sensing signal RS may include a first sensing signal RS1 that is charged along the first signal HS, and a second sensing signal RS2 that is charged along the second signal LS.

A level of the first sensing signal RS1 may gradually increase from the reference voltage VR such that the first sensing signal RS1 is charged to a maximum level, and the maximum level of the first sensing signal RS1 may be maintained during a given period. This operation period may be defined as a first charging period CP1.

When a touch TH1 is made in a state where the first sensing signal RS1 is not sufficiently charged, the touch TH1 may not be normally charged. When the first sensing signal RS1 reaches the maximum level, a touch TH2 may be normally sensed. In detail, the sensing of the touch TH2 made in a maximum level period where the maximum level should be maintained during the given period may be normally performed. The first charging period CP1 may be defined as a minimum period where the sensing of the touch TH2 is capable of being normally performed.

The first sensing signal RS1 may be reset in a first reset period RP1 following the first charging period CP1. The first sensing signal RS1 may be reset by the sensing-control part. The first period P1 may be defined as a sum of the first charging period CP1 and the first reset period RP1.

After the first sensing signal RS1 is reset, the second sensing signal RS2 may be charged. Only when the first sensing signal RS1 is reset, a touch-sensing operation may be normally performed by the second sensing signal RS2.

A level of the second sensing signal RS2 may gradually decrease from the reference voltage VR such that the second sensing signal RS2 is charged to a minimum level, and the minimum level of the second sensing signal RS2 may be maintained during a given period. This operation period may be defined as a second charging period CP2.

A touch may not be normally sensed in a state where the second sensing signal RS2 is not sufficiently charged. When the second sensing signal RS2 reaches the minimum level, a touch may be normally sensed. A touch made in a minimum level period where the minimum level should be maintained during the given period may be normally performed. The second charging period CP2 may be defined as a minimum period where a touch-sensing operation is capable of being normally performed.

The second sensing signal RS2 may be reset in a second reset period RP2 following the second charging period CP2. The second sensing signal RS2 may be reset by the sensing-control part. The second period P2 may be defined as a sum of the second charging period CP2 and the second reset period RP2.

Only when the first charging period CP1 and the first reset period RP1 are secured, and the second charging period CP2 and the second reset period RP2 are secured, may the touch operation be normally performed. As understood from the above description, to perform the touch operation normally, the first period P1 may be defined as a sum of at least the first charging period CP1 and the first reset period RP1, and the second period P2 may be defined as a sum of at least the second charging period CP2 and the second reset period RP2.

Figure 13:
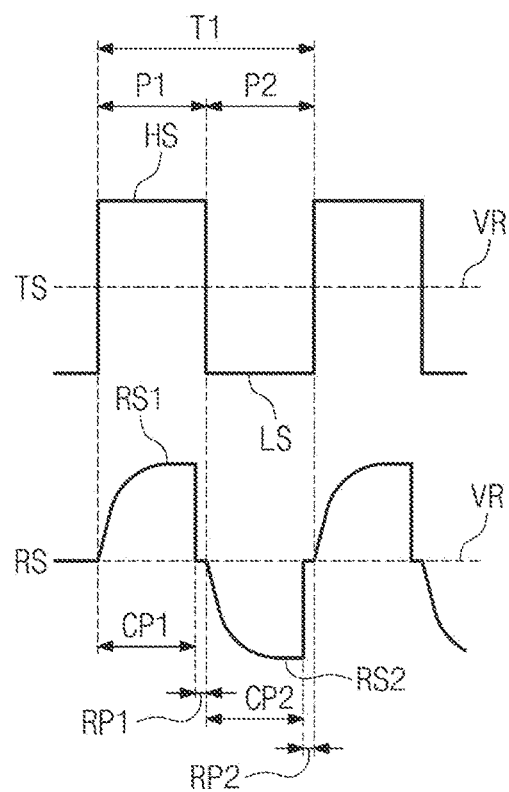
FIG. 13 is a timing diagram of a driving signal and a sensing signal when a driving signal illustrated in FIG. 7 has a first cycle.

FIG. 13 is a timing diagram of a driving signal and a sensing signal when a driving signal illustrated in FIG. 7 has a first cycle.

Referring to FIG. 13, the driving signal TS may have a first cycle T1. The first cycle T1 may be substantially equal to the cycle "T" illustrated in FIG. 12. Accordingly, the first cycle T1 may be defined by the first and second periods P1 and P2.

The first period P1 may be defined as a sum of the first charging period CP1 and the first reset period RP1, and the second period P2 may be defined as a sum of the second charging period CP2 and the second reset period RP2. The second period P2 may be substantially equal to the first period P1.

Figure 14:
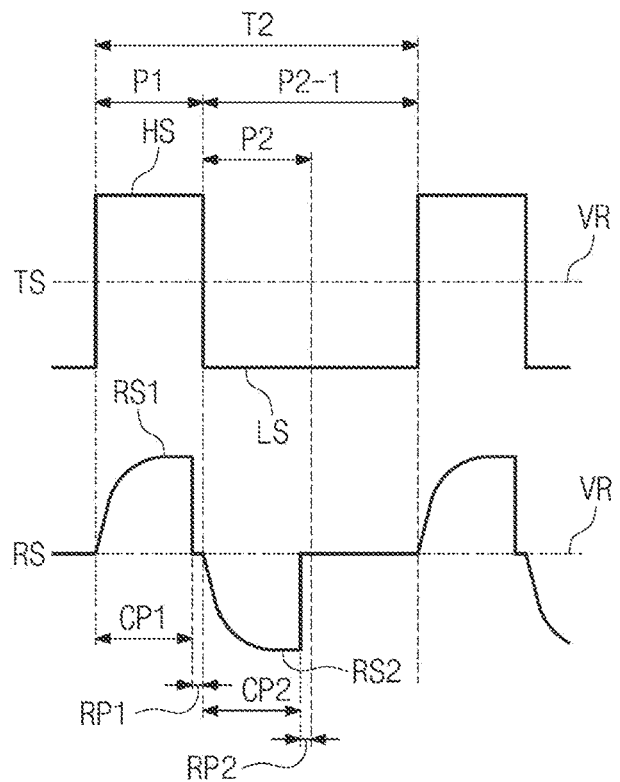
FIG. 14 is a timing diagram of a driving signal and a sensing signal when a driving signal illustrated in FIG. 7 has a second cycle.

FIG. 14 is a timing diagram of a driving signal and a sensing signal when a driving signal illustrated in FIG. 7 has a second cycle.

Referring to FIG. 14, the driving signal TS may have a second cycle T2. The second cycle T2 may be greater than the first cycle T1. A frequency may be inversely proportional to a cycle (or period). The frequency of the driving signal TS having the second cycle T2 may be lower than the frequency of the driving signal TS having the first cycle T1.

The period of the first signal HS may be fixed to the first period P1 (e.g., the period of the first signal HS may be constant). The period of the second period P2 may change from the second period P2 to a (2-1)-th period P2-1. The (2-1)-th period P2-1 may be greater than the first period P1. As the period of the second signal LS changes, the frequency of the driving signal TS may change.

Figure 15:
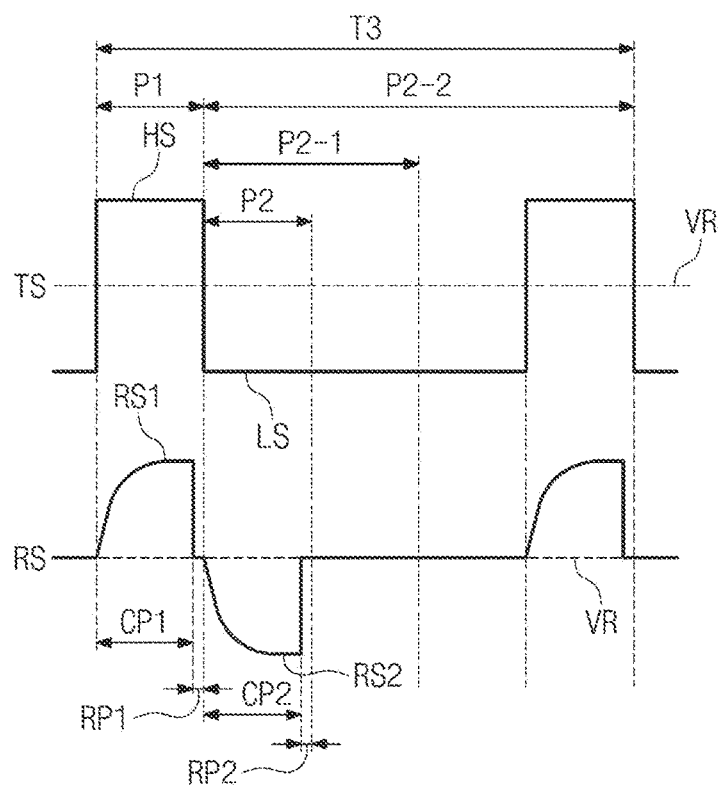
FIG. 15 is a timing diagram of a driving signal and a sensing signal when a driving signal illustrated in FIG. 7 has a third cycle.

FIG. 15 is a timing diagram of a driving signal and a sensing signal when a driving signal illustrated in FIG. 7 has a third cycle.

Referring to FIG. 15, the driving signal TS may have a third cycle T3. The third cycle T3 may be greater than the first cycle T1 and the second cycle T2. The frequency of the driving signal TS having the third cycle T3 may be lower than the frequency of the driving signal TS having the first cycle T1 and the frequency of the driving signal TS having the second cycle T2.

The period of the first signal HS may be fixed to the first period P1. The period of the second period P2 may change from the second period P2 to a (2-2)-th period P2-2. The (2-2)-th period P2-2 may be greater than the first period P1 and may be greater than the (2-1)-th period P2-1. As the period of the second signal LS changes, the frequency of the driving signal TS may change.

Referring to FIGS. 13, 14, and 15, the frequency of the driving signal TS may be variable. When the frequency of the driving signal TS changes, the period of the first signal HS may be fixed to the first period P1, and the period of the second signal LS may be variably set to the second period P2, the (2-1)-th period P2-1, or the (2-2)-th period P2-2. As the period of the second signal LS changes, the frequency of the driving signal TS may change.

The period of the second signal LS may be greater than or equal to the period of the first signal HS. For example, the period of the second signal LS may be set to a value that is greater than or equal to a sum of the second charging period CP2 and the second reset period RP2.

Figure 16:
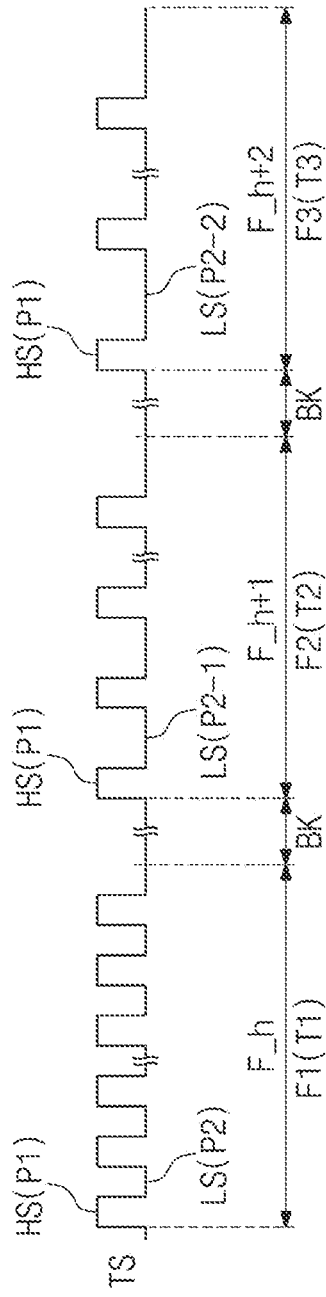
FIG. 16 is a timing diagram illustrating how a frequency of a driving signal changes, according to one or more embodiments of the present disclosure.

FIG. 16 is a timing diagram illustrating how a frequency of a driving signal changes, according to one or more embodiments of the present disclosure.

Referring to FIG. 16, the input-sensing part ISP may be driven by using a plurality of frames F_h, F_h+1, and F_h+2. Periods between the frames F_h, F_h+1, and F_h+2 may be defined as blank periods BK. Three frames F_h, F_h+1, and F_h+2 are illustrated as an example, but the number of frames is not limited thereto. The frequency of the driving signal TS may not be fixed to a specific frequency, and may change with one or more frames (e.g., may change every frame).

A first frequency F1 of the driving signal TS of the h-th frame F_h, a second frequency F2 of the driving signal TS of the (h+1)-th frame F_h+1, and a third frequency F3 of the driving signal TS of the (h+2)-th frame F_h+2 may be different from each other. Herein, h is a natural number.

For example, the first frequency F1 may have the first cycle T1, the second frequency F2 may have the second cycle T2 that is greater than the first cycle T1, and the third frequency F3 may have the third cycle T3 that is greater than the second cycle T2. The first, second, and third cycles T1, T2, and T3 may be the first, second, and third cycles T1, T2, and T3 illustrated in FIGS. 13, 14, and 15. Accordingly, the first frequency F1 may be higher than the second frequency F2, and the second frequency F2 may be higher than the third frequency F3.

The first period P1 of the first signal HS may be fixed without change in the h-th frame F_h, the (h+1)-th frame F_h+1, and the (h+2)-th frame F_h+2. The (2-1)-th period P2-1 of the second signal LS of the (h+1)-th frame F_h+1 may be greater than the second period P2 of the second signal LS of the h-th frame F_h. The (2-2)-th period P2-2 of the second signal LS of the (h+2)-th frame F_h+2 may be greater than the (2-1)-th period P2-1 of the second signal LS of the (h+1)-th frame F_h+1.

As described above, the frequency of the driving signal TS may be set to various frequencies, not fixed to a specific frequency, and may be applied to the first sensing electrodes SE1 every frame.

Figure 17:
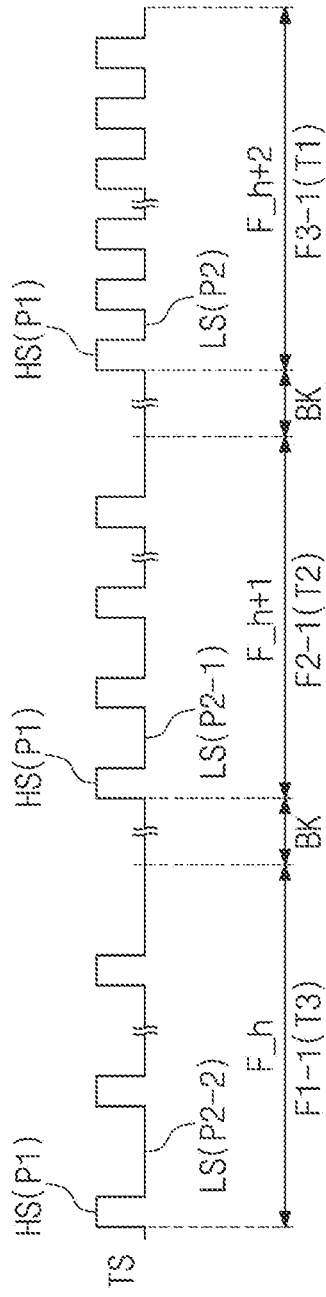
FIG. 17 is a timing diagram illustrating how a frequency of a driving signal changes, according to one or more embodiments of the present disclosure.

FIG. 17 is a timing diagram illustrating how a frequency of a driving signal changes, according to one or more embodiments of the present disclosure.

Referring to FIG. 17, the frequency of the driving signal TS may not be fixed to a specific frequency, and may change with one or more frames (e.g., may change every frame). A first frequency F1-1 of the driving signal TS of the h-th frame F_h, a second frequency F2-1 of the driving signal TS of the (h+1)-th frame F_h+1, and a third frequency F3-1 of the driving signal TS of the (h+2)-th frame F_h+2 may be different from each other.

For example, the first frequency F1-1 may have the third cycle T3, the second frequency F2-1 may have the second cycle T2, and the third frequency F3-1 may have the first cycle T1. Accordingly, the first frequency F1-1 may be lower than the second frequency F2-1, and the second frequency F2-1 may be lower than the third frequency F3-1.

The first period P1 of the first signal HS may be fixed without change in the h-th frame F_h, the (h+1)-th frame F_h+1, and the (h+2)-th frame F_h+2. The (2-1)-th period P2-1 of the second signal LS of the (h+1)-th frame F_h+1 may be less than the second period P2-2 of the second signal LS of the h-th frame F_h. The second period P2 of the second signal LS of the (h+2)-th frame F_h+2 may be less than the (2-1)-th period P2-1 of the second signal LS of the (h+1)-th frame F_h+1.

As described above, the frequency of the driving signal TS may be set to various frequencies, not fixed to a specific frequency, and may be applied to the first sensing electrodes SE1 every frame.

FIG. 18 is a timing diagram illustrating how a frequency of a driving signal changes, according to one or more embodiments of the present disclosure.

Referring to FIG. 18, a first frequency F1-2 of the driving signal TS of the h-th frame F_h, a second frequency F2-2 of the driving signal TS of the (h+1)-th frame F_h+1, and a third frequency F3-2 of the driving signal TS of the (h+2)-th frame F_h+2 may be different from each other.

For example, the first frequency F1-2 may have the second cycle T2, the second frequency F2-2 may have the third cycle T3, and the third frequency F3-2 may have the first cycle T1. Accordingly, the first frequency F1-2 may be higher than the second frequency F2-2, and the third frequency F3-2 may be higher than the first frequency F1-2.

The first period P1 of the first signal HS may be fixed without change in the h-th frame F_h, the (h+1)-th frame F_h+1, and the (h+2)-th frame F_h+2. The (2-2)-th period P2-2 of the second signal LS of the (h+1)-th frame F_h+1 may be greater than the (2-1)-th period P2-1 of the second signal LS of the h-th frame F_h. The second period P2 of the second signal LS of the (h+2)-th frame F_h+2 may be less than the (2-1)-th period P2-1 of the second signal LS of the h-th frame F_h.

FIG. 19 is a timing diagram illustrating how a frequency of a driving signal changes, according to one or more embodiments of the present disclosure.

Referring to FIG. 19, a first frequency F1-3 of the driving signal TS of the h-th frame F_h, a second frequency F2-3 of the driving signal TS of the (h+1)-th frame F_h+1, and a third frequency F3-3 of the driving signal TS of the (h+2)-th frame F_h+2 may be different from each other.

For example, the first frequency F1-3 may have the second cycle T2, the second frequency F2-3 may have the first cycle T1, and the third frequency F3-3 may have the third cycle T3. Accordingly, the first frequency F1-3 may be lower than the second frequency F2-1, and the third frequency F3-1 may be lower than the first frequency F1-3.

The first period P1 of the first signal HS may be fixed without change in the h-th frame F_h, the (h+1)-th frame F_h+1, and the (h+2)-th frame F_h+2. The second period P2 of the second signal LS of the (h+1)-th frame F_h+1 may be less than the (2-1)-th period P2-1 of the second signal LS of the h-th frame F_h. The (2-2)-th period P2-2 of the second signal LS of the (h+2)-th frame F_h+2 may be greater than the (2-1)-th period P2-1 of the second signal LS of the h-th frame F_h.

Examples of the driving signal TS whose frequency is variably changed to three frequencies F1, F2, and F3 in frames are illustrated in FIGS. 16 to 19, but the frequency of the driving signal TS may be variably changed to four or more frequencies.

Figure 20:
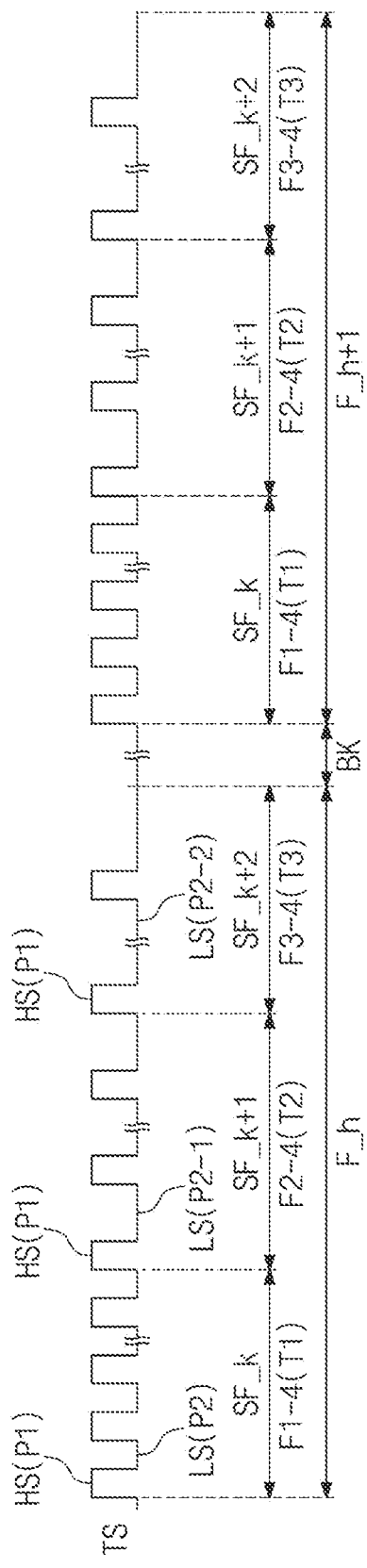
FIG. 20 is a timing diagram illustrating how a frequency of a driving signal changes, according to one or more embodiments of the present disclosure.

FIG. 20 is a timing diagram illustrating how a frequency of a driving signal changes, according to one or more embodiments of the present disclosure.

Referring to FIG. 20, the frequency of the driving signal TS may not be fixed to a specific frequency and may change within a frame. Each of frames F_h and F_h+1 may include a k-th sub frame SF_k, a (k+1)-th sub frame SF_k+1, and a (k+2)-th sub frame SF_k+2. Herein, k may be a natural number. Three sub frames SF_k, SF_k+1, and SF_k+2 are illustrated as an example, but the present disclosure is not limited thereto. For example, each of the frames F_h and F_h+1 may include four or more sub frames.

A first frequency F1-4 of the driving signal TS of the k-th sub frame SF_k, a second frequency F2-4 of the driving signal TS of the (k+1)-th sub frame SF_k+1, and a third frequency F3-4 of the driving signal TS of the (k+2)-th sub frame SF_k+2 may be different from each other.

For example, the first frequency F1-4 may have the first cycle T1, the second frequency F2-4 may have the second cycle T2, and the third frequency F3-4 may have the third cycle T3. Accordingly, the first frequency F1-4 may be higher than the second frequency F2-4, and the second frequency F2-4 may be higher than the third frequency F3-4.

The first period P1 of the first signal HS may be fixed without change in the sub frames SF_k, SF_k+1, and SF_k+2. The (2-1)-th period P2-1 of the second signal LS of the (k+1)-th sub frame SF_k+1 may be greater than the second period P2 of the second signal LS of the k-th sub frame SF_k. The (2-2)-th period P2-2 of the second signal LS of the (k+2)-th sub frame SF_k+2 may be greater than the (2-1)-th period P2-1 of the second signal LS of the (k+1)-th sub frame SF_k+1.

As described above, the frequency of the driving signal TS may be set to various frequencies, not fixed to a specific frequency, and may be applied to the first sensing electrodes SE1 every sub frame.

Figure 21:
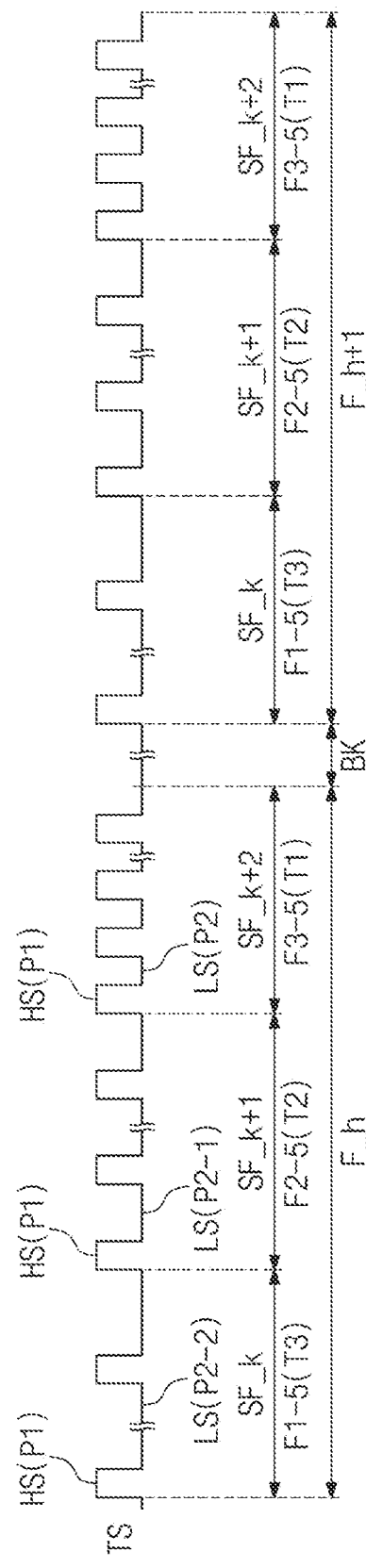
FIG. 21 is a timing diagram illustrating how a frequency of a driving signal changes, according to one or more embodiments of the present disclosure.

FIG. 21 is a timing diagram illustrating how a frequency of a driving signal changes, according to one or more embodiments of the present disclosure.

Referring to FIG. 21, each of frames F_h and F_h+1 may include sub frames SF_k, SF_k+1, and SF_k+2. A first frequency F1-5 of the driving signal TS of the k-th sub frame SF_k, a second frequency F2-5 of the driving signal TS of the (k+1)-th sub frame SF_k+1, and a third frequency F3-5 of the driving signal TS of the (k+2)-th sub frame SF_k+2 may be different from each other.

For example, the first frequency F1-5 may have the third cycle T3, the second frequency F2-5 may have the second cycle T2, and the third frequency F3-5 may have the first cycle T1. Accordingly, the first frequency F1-5 may be lower than the second frequency F2-5, and the second frequency F2-5 may be lower than the third frequency F3-5.

The first period P1 of the first signal HS may be fixed without change in the sub frames SF_k, SF_k+1, and SF_k+2. The (2-1)-th period P2-1 of the second signal LS of the (k+1)-th sub frame SF_k+1 may be less than the (2-2)-th period P2-2 of the second signal LS of the k-th sub frame SF_k. The second period P2 of the second signal LS of the (k+2)-th sub frame SF_k+2 may be less than the (2-1)-th period P2-1 of the second signal LS of the (k+1)-th sub frame SF_k+1.

As described above, the frequency of the driving signal TS may be set to various frequencies, not fixed to a specific frequency, and may be applied to the first sensing electrodes SE1 every sub frame.

Figure 22:
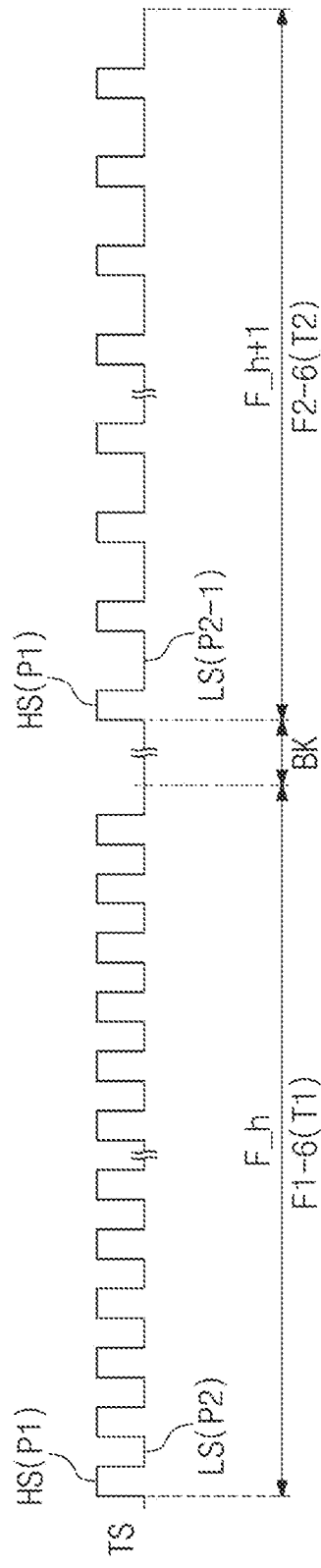
FIG. 22 is a timing diagram illustrating how a frequency of a driving signal changes, according to one or more embodiments of the present disclosure.

FIG. 22 is a timing diagram illustrating how a frequency of a driving signal changes, according to one or more embodiments of the present disclosure.

A first frequency F1-6 of the driving signal TS of the h-th frame F_h may be different from a second frequency F2-6 of the driving signal TS of the (h+1)-th frame F_h+1.

The first frequency F1-6 may have the first cycle T1, and the second frequency F2-6 may have the second cycle T2. The first frequency F1-6 may be higher than the second frequency F2-6.

The first period P1 of the first signal HS may be fixed without change in the frames F_h and F_h+1. The (2-1)-th period P2-1 of the second signal LS of the (h+1)-th frame F_h+1 may be greater than the second period P2 of the second signal LS of the h-th frame F_h.

In one or more embodiments, frequencies of the first cycle T1 and the second cycle T2 are repeated in the frames F_h and F_h+1, but the present disclosure is not limited thereto. For example, frequencies of the first cycle T1 and the third cycle T3 may be repeated, or frequencies of the second cycle T2 and the third cycle T3 may be repeated.

Figure 23:
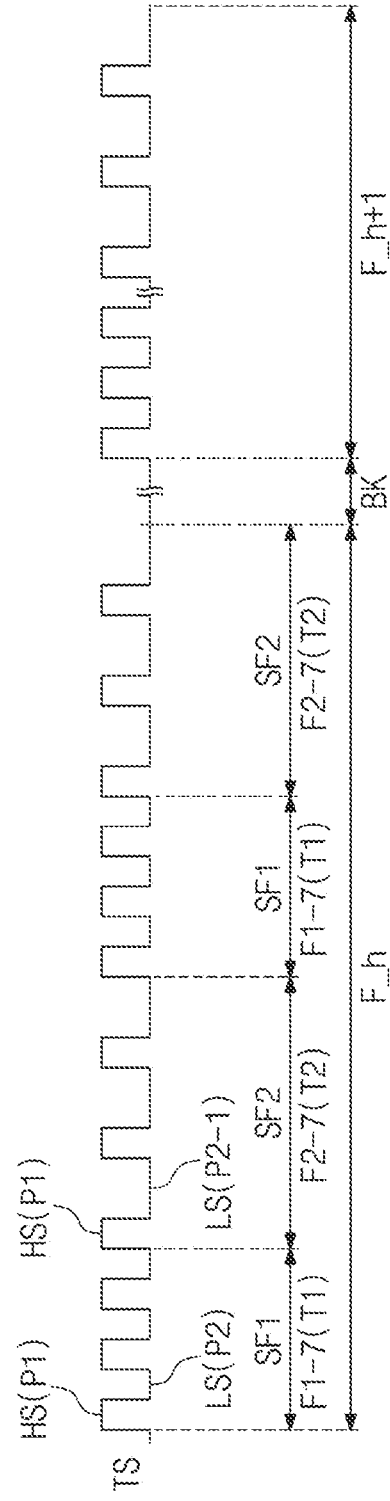
FIG. 23 is a timing diagram illustrating how a frequency of a driving signal changes, according to one or more embodiments of the present disclosure.

FIG. 23 is a timing diagram illustrating how a frequency of a driving signal changes, according to one or more embodiments of the present disclosure.

Referring to FIG. 23, each of frames F_h and F_h+1 may include a plurality of first sub frames SF1 and a plurality of second sub frames SF2. The second sub frames SF2 may be frames respectively following the first sub frames SF1. That is, the first sub frame SF1, and the second sub frame SF2 following the first sub frame SF1, may be repeated.

A first frequency F1-7 of the driving signal TS of each of the first sub frames SF1, and a second frequency F2-7 of the driving signal TS of each of the second sub frames SF2, may be different from each other. The first frequency F1-7 may have the first cycle T1, and the second frequency F2-7 may have the second cycle T2. The first frequency F1-7 may be higher than the second frequency F2-7.

The first period P1 of the first signal HS may be fixed without change in the first and second sub frames SF1 and SF2. The (2-1)-th period P2-1 of the second signal LS of the second sub frames SF2 may be greater than the second period P2 of the second signal LS of the first sub frames SF1.

In one or more embodiments, frequencies of the first cycle T1 and the second cycle T2 are repeated in the frames F_h and F_h+1, but the present disclosure is not limited thereto. For example, frequencies of the first cycle T1 and the third cycle T3 may be repeated, or frequencies of the second cycle T2 and the third cycle T3 may be repeated.

Each of the first and second sub frames SF1 and SF2 may include at least one pulse. For example, each of the first and second sub frames SF1 and SF2 may include three pulses, but the number of pulses of each of the first and second sub frames SF1 and SF2 is not limited thereto.

Figure 24:
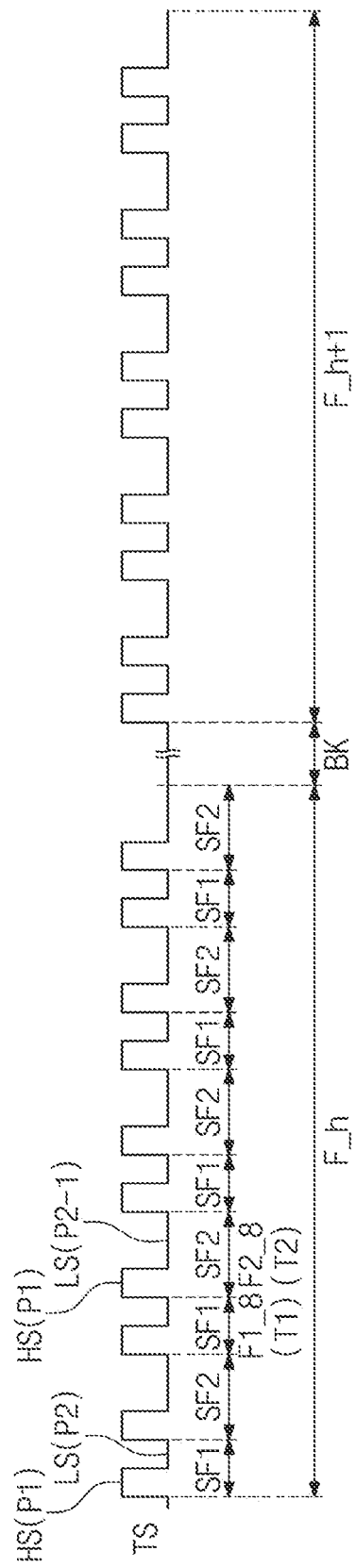
FIG. 24 is a timing diagram illustrating how a frequency of a driving signal changes, according to one or more embodiments of the present disclosure.

FIG. 24 is a timing diagram illustrating how a frequency of a driving signal changes, according to one or more embodiments of the present disclosure.

Referring to FIG. 24, in each of frames F_h and F_h+1, a first frequency F1-8 of the driving signal TS of each of the first sub frames SF1 may have the first cycle T1, and a second frequency F2-8 of the driving signal TS of each of the second sub frames SF2 may have the second cycle T2. The first frequency F1-8 may be higher than the second frequency F2-8.

The first period P1 of the first signal HS may be fixed without change, and the (2-1)-th period P2-1 of the second signal LS of each of the second sub frames SF2 may be greater than the second period P2 of the second signal LS of each of the first sub frames SF1.

Each of the first and second sub frames SF1 and SF2 may include at least one pulse. For example, each of the first and second sub frames SF1 and SF2 may include one pulse.

Figure 25:
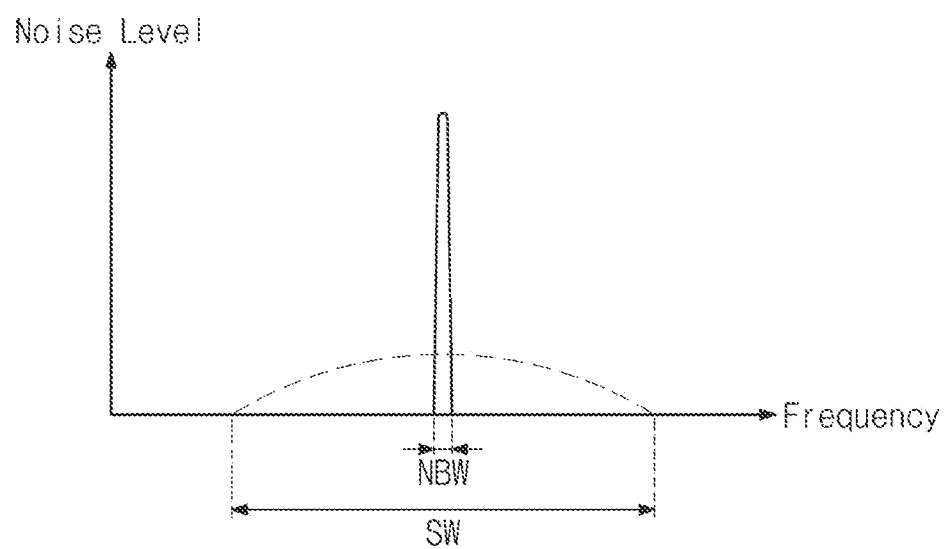
FIG. 25 is a graph illustrating a noise level according to a frequency of a driving signal.

FIG. 25 is a graph illustrating a noise level according to a frequency of a driving signal.

Referring to FIGS. 7 and 25, when the driving signal TS with a given frequency is applied to the first sensing electrodes SE1, the electromagnetic wave according to the driving signal TS may be radiated as an unnecessary electromagnetic signal. The electromagnetic signal may act as noise to (i.e., may electromagnetically interfere with) other devices. That is, the electromagnetic signal may interfere with operations of the other devices. For example, the electromagnetic signal of the input-sensing part ISP may affect the operation of the display panel DP.

The driving signal TS may have a narrow frequency band NBW. For example, the driving signal TS whose frequency is fixed to a frequency corresponding to the second cycle T2 may be applied to the input-sensing part ISP. In this case, the energy may be focused on, thereby making a noise level high.

In one or more embodiments of the present disclosure, the driving signal TS may be set to various frequencies and may be applied to the input-sensing part ISP. This operation may be defined as the spread spectrum. Accordingly, the driving signal TS may have a wider frequency band SW. As the frequency band of the driving signal TS becomes wider, the energy may be distributed without being focused on, and thus, a noise level may become lower.

According to one or more embodiments of the present disclosure, a driving signal may be applied to sensing electrodes as a signal whose bandwidth is widened by using a band spread manner. That is, as the driving signal that is set to various frequencies is applied to sensing electrodes, the electromagnetic interference may decrease.

While the present disclosure has been described with reference to embodiments thereof, it will be apparent to those of ordinary skill in the art that various changes and modifications may be made thereto without departing from the spirit and scope of the present disclosure as set forth in the following claims, with functional equivalents thereof to be included therein.

What is claimed is:

1. An input-sensing part comprising:
   first sensing electrodes configured to receive a driving signal having a variable frequency; and
   second sensing electrodes insulated from the first sensing electrodes, extending to cross the first sensing electrodes, and configured to output a sensing signal,
   wherein a cycle of the driving signal is defined by a first period of a first signal, and a second period of a second signal following the first signal and lower in level than the first signal, and
   wherein, when the frequency of the driving signal changes, the first period is constant for different versions of the driving signal having different respective frequencies, the second period changes for the different versions of the driving signal and the second period changes to be greater than or equal to the first period.

2. The input-sensing part of claim 1, wherein the second period is greater than or equal to the first period.

3. The input-sensing part of claim 2, wherein the first period is set to a sum of a first charging period, in which the sensing signal is charged to a maximum level along the first signal and maintains the maximum level during a given time, and a first reset period following the first charging period.

4. The input-sensing part of claim 2, wherein the second period is set to a value that is greater than or equal to a sum of a second charging period, in which the sensing signal is charged to a minimum level along the second signal and maintains the minimum level during a given time, and a second reset period following the second charging period.

5. The input-sensing part of claim 1, wherein the frequency changes every frame.

6. The input-sensing part of claim 1, wherein the frequency of the driving signal of a h-th frame is different from the frequency of the driving signal of a (h+1)-th frame, where h is a natural number.

7. The input-sensing part of claim 6, wherein the second period of the (h+1)-th frame is greater than the second period of the h-th frame.

8. The input-sensing part of claim 6, wherein the second period of the (h+1)-th frame is less than the second period of the h-th frame.

9. The input-sensing part of claim 6, wherein the frequency of the driving signal of the h-th frame, the frequency of the driving signal of the (h+1)-th frame, and the frequency of the driving signal of a (h+2)-th frame are different from each other.

10. The input-sensing part of claim 9, wherein the second period of the (h+1)-th frame is greater than the second period of the h-th frame, and the second period of the (h+2)-th frame is greater than the second period of the (h+1)-th frame.

11. The input-sensing part of claim 9, wherein the second period of the (h+1)-th frame is less than the second period of the h-th frame, and the second period of the (h+2)-th frame is less than the second period of the (h+1)-th frame.

12. The input-sensing part of claim 9, wherein the second period of the (h+1)-th frame is greater than the second period of the h-th frame, and the second period of the (h+2)-th frame is less than the second period of the h-th frame.

13. The input-sensing part of claim 9, wherein the second period of the (h+1)-th frame is less than the second period of the h-th frame, and the second period of the (h+2)-th frame is greater than the second period of the h-th frame.

14. An input-sensing part comprising:
first sensing electrodes configured to receive a driving signal having a variable frequency; and
second sensing electrodes insulated from the first sensing electrodes, extending to cross the first sensing electrodes, and configured to output a sensing signal,
wherein a cycle of the driving signal is defined by a first period of a first signal, and a second period of a second signal following the first signal and lower in level than the first signal,
wherein, when the frequency of the driving signal changes, the first period is constant, and the second period changes,
wherein a h-th frame comprises sub frames, and
wherein the frequency of the driving signal of a k-th sub frame is different from the frequency of the driving signal of a (k+1)-th sub frame, where k is a natural number.

15. The input-sensing part of claim 14, wherein the second period of the (k+1)-th sub frame is greater than the second period of the k-th sub frame.

16. The input-sensing part of claim 14, wherein the second period of the (k+1)-th sub frame is less than the second period of the k-th sub frame.

17. The input-sensing part of claim 1, wherein a h-th frame comprises first sub frames, and second sub frames respectively following the first sub frames, and
wherein the frequency of the driving signal of the first sub frames and the frequency of the driving signal of the second sub frames are different from each other.

18. The input-sensing part of claim 17, wherein each of the first and second sub frames comprises at least one pulse.

19. An input-sensing part comprising:
first sensing electrodes configured to receive a driving signal having variable frequency; and
second sensing electrodes insulated from the first sensing electrodes, extending to cross the first sensing electrodes, and configured to output a sensing signal,
wherein a cycle of the driving signal is defined by a first period of a first signal, and a second period of a second signal following the first signal and lower in level than the first signal, and
wherein, when the frequency of the driving signal changes, the first period is constant for different versions of the driving signal having different respective frequencies, the second period changes for the different versions of the driving signal, and the second period changes to be greater than or equal to the first period.

20. A display device comprising:
a display panel; and
an input-sensing part on the display panel, and comprising:
first sensing electrodes configured to receive a driving signal having variable frequency; and
second sensing electrodes insulated from the first sensing electrodes, extending to cross the first sensing electrodes, and configured to output a sensing signal,
wherein a cycle of the driving signal is defined by a first period of a first signal, and a second period of a second signal following the first signal and lower in level than the first signal, and
wherein, when the frequency of the driving signal changes, the first period is constant for different versions of the driving signal having different respective frequencies, and the second period changes for the different versions of the driving signal.

* * * * *